United States Patent [19]

Paton et al.

[11] Patent Number: 4,996,409
[45] Date of Patent: Feb. 26, 1991

[54] ARC-WELDING MONITOR

[76] Inventors: Boris E. Paton, ulitsa Chkalova, 41a, kv.26; Vsevolod V. Vasiliev, prospekt 40-letia Oktyabrya, 82, kv.60; Valentin A. Bogdanovsky, Laboratorny pereulok, 22, kv.10; Konstantin V. Shelekhov, Saratovskaya ulitsa, 14/9, kv.31; Viktor M. Gavva, prospekt Marshala Koshevogo, 22, kv.117, all of Kiev; Vladimir D. Bigdash, Vasilkovsky raion, poselok Glevakha, Lesnaya ulitsa, 73, Kievskava oblast; Ivan A. Tabunschik, prospekt Chubarya, 36b, kv.12.; Andrei P. Ilchishin, pereulok Schorsa, 5a, kv.2, both of Kiev, all of U.S.S.R.

[21] Appl. No.: 398,829

[22] Filed: Aug. 25, 1989

[51] Int. Cl.$^5$ .............................................. B23K 9/095
[52] U.S. Cl. .................................. 219/130.01; 219/136
[58] Field of Search ...................... 219/130.01, 130.21, 219/136

[56] References Cited

U.S. PATENT DOCUMENTS 4,375,026  2/1983  Kearney ..................... 219/130.01
4,471,207  9/1984  Hawkes ..................... 219/130.01
4,677,277  6/1987  Cook et al. ................. 219/130.01

Primary Examiner—Clifford C. Shaw
Attorney, Agent, or Firm—Lilling & Lilling

[57] ABSTRACT

The arc-welding monitor has a weld power supply, units for generating signals proportional to welding current and voltage, an audio-signal generator, welding current and voltage comparators and a monitoring sequence logic analyzer having a signal switch responsive to variations of monitored quantities, which is connected to the outputs of said welding current and voltage comparators, a signal switch responsive to incremental changes in monitored parameters, and welding current and voltage adders. One input of each adder is connected to the outputs of said units for generating signals proportional to welding current and voltage, respectively, while the second input of each adder is combined with the input of the corresponding comparator, the outputs thereof being connected to the inputs of the signal switch responsive to incremental changes in monitored parameters.

37 Claims, 14 Drawing Sheets

ARC-WELDING MONITOR

BACKGROUND OF THE INVENTION

1. Field of the Invention

The present invention relates to arc-welding facilities and in particular to an arc-welding monitor.

The invention may be used in manual, mechanized and automatic arc welding, primarily with a consumable electrode in power engineering, construction of oil and gas pipe-lines, nuclear power engineering and shipbuilding.

2. Description of the Prior Art

A known weld quality monitor comprises welding current, voltage and speed sensors, a comparator for comparing each welding current, voltage and speed signal with a threshold value corresponding to optimal conditions, and a calculator utilizing welding current, voltage and speed signals to produce signals indicative of heat input, configuration of a weld and cooling rate.

During the welding operation, the afore-mentioned monitor monitors welding current, voltage and speed by comparing the monitored quantities with a reference value. An alarm is activated when a preselected variation in the measured and reference quantities occurs. The monitored quantities are also used to compute additional welding parameters including heat input, configuration of a weld and cooling rate, which are likewise compared to threshold values to monitor quality of a weld. The sensors used for measuring the welding parameters are selected so as to provide minimal interference with the welding process. For example, Hall effect transducers are used for current measurements, while unique opto-electronic noncontacting sensors are used for measuring welding speed (cf. U.S. Pat. No. 4,375,026).

In the known monitor the welding speed is monitored indirectly by a constant temperature difference over a constant weld length, which is not essentially speed monitoring since an indirect parameter indicative of a temperature difference depends not only on the welding speed but also on the welding current, voltage and other parameters. Moreover, any sporadic changes in current, voltage, speed and other welding parameters will not result in a variation of a temperature difference although quality of a weld will be adversely affected. Hence, welding speed variations from threshold values will not be accounted for, a disadvantage substantially decreasing accuracy in monitoring the given parameter.

From the aforesaid it follows that accuracy in monitoring general welding parameters determined by the calculator, more specifically, heat input, configuration of a weld and cooling rate will also be decreased due to its relation to the speed monitoring accuracy.

In the foregoing monitor no provision is made for monitoring such parameters as electrode slope, electrode feed rate disturbances, for example, in semiautomatic consumable-electrode gas-shielded arc welding, and supply-line voltage disturbances, for example, in manual and semiautomatic consumable-electrode arc welding, which substantially affect quality of a weld.

Furthermore, the known monitor may not be used to effect consecutive stage-by-stage welding monitoring due to the fact that selective activation of an alarm in response to a specific monitored quantity is impossible. The above limitation primarily concerns welding speed variations when alarm activation is generally ambiguous since speed signal variations are monitored indirectly by a change in a temperature difference although such variations may be caused by changes in other parameters excluding the speed, more specifically, by welding current and voltage changes.

Thus, in the known weld quality monitor accuracy and reliability of monitoring quality of a weld are fairly low, another disadvantage being low effectiveness in monitoring the welding process.

There is also known an apparatus for providing useful audio feedback to users of arc-welding equipment, wherein the user is provided with audible feedback signals which convey useful information relating to the output current and voltage of the welder (cf. U.S. Pat. No. 4,471,207).

The known apparatus comprises a weld power supply, a unit for generating a signal proportional to welding current, a unit for generating a signal proportional to welding voltage, said units being connected to said weld power supply, an audio-signal generator producing audio tones corresponding to welding parameters, a threshold element having its input connected to the output of the unit for generating a current-proportional signal and its output connected to the input of the audio-signal generator, a recorder connected to the outputs of the units for generating current- and voltage-proportional signals, and a welding operator's helmet with headphones at which audio signals arrive simultaneously with the recorder to enable audio monitoring of the arc-welding process.

The afore-mentioned apparatus operates in the following manner. An audio tone is generated and is frequency modulated by a signal which corresponds to welding voltage. The tone is amplitude modulated by a signal corresponding to welding current. Thus, the user is provided with a synthesized feedback signal having a voltage-proportional pitch and current-proportional volume. Additional modulation means are disclosed for introducing a current-proportional warble component to said tone.

In such an apparatus feedback signals obtained in monitoring are frequency and amplitude modulated, which makes it possible to evaluate quality of the welding process but prevents reliable and accurate quantitative monitoring of welding parameters (current and voltage).

The multiparametric welding process may not be monitored properly by using information relating to welding quality, which primarily concerns current and voltage changes. Although the welding process is appreciably affected by voltage and current changes, its stability ensuring a quality weld with desired characteristics and size over the entire length is attainable when a fairly large number of parameters are maintained within optimal limits. These are, for example, welding speed, electrode slope, as well as the previously mentioned welding current and voltage. Stabilization of the welding speed is required since its variation interferes with metallurgical reactions, which results in irregular input of heat, molten metal and additives, and also in isolation of metal from the air with gas or other shielding, a disadvantage causing changes in weld shape and depth. When speed variations are great, there may be undercuts and porosity in a weld due to unstable hydrodynamic conditions in a weldpool. Metal transfer in an arc and melting of base metal are noticeably affected by variations in electrode slope. By keeping it within predetermined limits, for example, in manual arc welding of groove joints, it is possible to uniformly deposit a layer of molten slag on molten metal in a bead and prevent hearth cinder from getting on unfused weld metal before reaching the arc. In mechanized gas-shielded arc welding, an undesirable change in electrode slope θ increases sputtering whereby input of heat, electrode and filler metal and other conditions will also change, a factor making occurrence of defects in a weld more probable. In the known apparatus, no account is made of changes in welding speed and electrode slope, which occur due to impaired welding conditions, for example, when the user is an inexperienced operator, a disadvantage preventing the monitoring of individual quantities or the set of parameters. As a result, reliability of monitoring the welding process is appreciably decreased.

Moreover, in the known apparatus use is made of only two interrelated parameters (welding current and voltage) with no account taken of other welding parameters, a feature preventing effective monitoring of the welding process due to the fact that the user is provided with feedback signals by changing audio frequency in the headphones in the event of any variations of individual parameters, for example, monitored welding voltage and current, including corresponding simultaneous changes in magnitude and sign of other parameters, for example, welding speed, which does not essentially affect conditions for obtaining a high quality weld. So, the welding operator receives superfluous audio feedback signals and may inadvertently impair quality of a weld. From the aforesaid it follows that the known apparatus does not permit consecutive stage-by-stage monitoring of the welding process, the first stage of which should involve monitoring of one predetermined quantity, for example, welding voltage or current, speed, or electrode slope, while at the second stage, best suited to satisfy the requirements for an actual quality weld, one or more parameters have to be monitored by comparing the measured values with reference data in different combinations thereof taking into account the interrelation between said parameters. Inasmuch as the known apparatus includes no such means, its accuracy in evaluating quality of the welding process is fairly low.

Moreover, the known device does not allow effective monitoring of the welding process for it utilizes the relationship between two welding parameters (current and voltage) by generating a tone having such variable characteristics as amplitude dependent on one parameter, for example, welding current and frequency dependent on the other parameter, for example, welding voltage. This disadvantage is attributed to the fact that it usually takes the welder a long time to adapt his ear for the frequency and amplitude of audio tones characteristic of quality welds under specific welding conditions. Adaptation for tone amplitudes takes more time since frequency characteristics of auditory ducts of an operator are of a more sensitive and permanent nature than their amplitude characteristics which are, to a large measure, dependent on physiological peculiarities of an individual.

So, recognition of a specific tone amplitude is more readily affected by such factors as audio welding characteristics, for example, noise arising from an arc, which may completely obscure the low-amplitude tone. Another factor to be taken into account is inadvertent displacement of headphones from auditory ducts of the welder, which substantially affects recognition of the tone amplitude, but has a less noticeable effect upon recognition of the tone frequency.

The welder's ability to recognize a specific (optimal) tone frequency indicative of a quality weld is impeded by utilization of different frequencies in the known apparatus to suit particular welding parameters determined by welding conditions. To obtain a quality weld in different welding conditions, said welding parameters should be suitably varied. Thus, the welding operator may not directly monitor quality of a weld in different welding conditions with the known apparatus wherein current values are set depending on other welding parameters.

Accuracy of monitoring the welding process and, consequently, its effectiveness are appreciably decreased due to a wide use of amplitude modulation of signals proportional to welding parameters and also of their frequency modulation without appropriately changing the parameters to obtain a quality weld in different welding conditions.

Moreover, qualitative monitoring of varying welding parameters prevents the known apparatus from determining to a fairly high accuracy the numerical values (i.e., setting signals) of said welding parameters corresponding to a quality weld and utilizing them for making the audio tone indicative of a quality weld.

In manual and mechanized arc welding, the operation of the known apparatus is adversely affected by disturbances of supply-line voltage. Such an effect leads to spontaneous variations of welding voltage and current from a predetermined value whereby spurious audio feedback signals will be heard in the welder's headphones, a factor interfering with normal monitoring.

Also, in mechanized gas-shielded arc welding, the operation of the afore-mentioned apparatus is adversely affected by electrode feed rate disturbances occurring primarily due to changes in the feeder drive speed. This results in spontaneous variations of welding current from a predetermined value whereby spurious audio feedback signals will be heard in the welder's headphones, a limitation impairing the monitoring process.

SUMMARY OF THE INVENTION

It is an object of the present invention to create a welding monitor which would ensure high accuracy in monitoring welding parameters both separately and jointly.

Another object of the invention is to enhance reliability in monitoring the welding process.

Still another object of the invention is to control weld quality on a real-time basis.

A further object of the invention is to create conditions for predicting operational characteristics of a formed weld.

One more object of the invention is to monitor welder's actions during the welding process.

It is another object of the invention to compute such values of setting signals of corresponding welding parameters, which would make it possible to optimize the process of welding like items both for one parameter and for a whole set of parameters.

It is still another object of the invention to provide similar attributes of audio feedback signals indicative of an optimal weld in different welding and monitoring conditions, which will increase monitoring effectiveness.

There is provided an arc-welding monitor comprising a weld power supply, a unit for generating a signal proportional to welding current, a unit for generating a signal proportional to welding voltage, said units being connected to said power supply, an audio-signal generator furnishing audio signals responsive to arc-welding parameters, a threshold element having its input connected to the output of the unit for generating a signal proportional to welding current and its output connected to the input of the audio-signal generator, an information recorder and a welding operator's helmet with a playback means, receiving, concurrently with the information recorder, audio signals from the audio-signal generator to effect audio monitoring of the arc welding process. According to the invention, the arc-welding monitor further comprises a welding current comparator, a welding voltage comparator, one input of each comparator being connected, respectively, to the output of the unit for generating a signal proportional to welding current and to the output of the unit for generating a signal proportional to welding voltage, second inputs thereof receiving welding current and voltage setting signals, respectively, while the outputs of said comparators are connected to the inputs of the information recorder and to the inputs of a monitoring sequence logic analyzer including a signal switch responsive to variations of monitored parameters having its inputs connected to the outputs of the welding current and voltage comparators, and a signal switch responsive to incremental changes in monitored parameters, current and voltage adders, one input of each adder being connected, respectively, to the output of the unit for generating a signal proportional to welding current and to the output of the unit for generating a signal proportional to welding voltage, second inputs of said adders being combined with the respective second input of the welding current and voltage comparators, while the outputs thereof are connected to the input of the signal switch responsive to incremental changes in monitored parameters, the outputs of both switches acting as the outputs of the logic analyzer and being connected to the inputs of the audio-signal generator.

It is preferable that the monitor according to the invention should comprise a unit for generating a signal proportional to welding speed, which is connected to the input of the information recorder, a welding speed comparator, one input of which is connected to the unit for generating a signal proportional to welding speed, and a welding speed setting circuit having its output connected to the input of the welding speed comparator whose output is connected to the inputs of the audio-signal generator and the information recorder, while the logic analyzer includes a signal subtraction circuit having its inputs connected to the output of the unit for generating a signal proportional to welding speed and to the output of the welding speed setting circuit, the output thereof being connected to the input of the audio-signal generator.

To monitor mechanized consumable-electrode arc welding, the proposed monitor desirably comprises such series-connected components as a consumable-electrode feed rate sensor, a unit for generating signals proportional to consumable-electrode feed rate and a consumable-electrode feed rate comparator, one input of which receives a welding current setting signal and whose output is connected to the input of the information recorder.

It is advantageous that the logic analyzer should comprise a circuit used to determine the effect of a varying consumable-electrode feed rate, which includes a consumable-electrode feed rate switch connected to the output of the unit for generating a signal proportional to welding current, a first adder, one input of which receives a welding current setting signal, while its other input is connected to the output of the unit for generating a signal proportional to a consumable-electrode feed rate, and a second adder having its input connected to the output of the first adder and to the output of the consumable-electrode feed rate switch, while its output is connected to the input of said switch whose output is connected to the input of the welding current comparator, the output of the consumable-electrode feed rate switch being desirably connected to the input of the current adder.

It is also advantageous that the monitor according to the invention should comprise a supply-line voltage transducer connected with a supply line of the weld power supply and a second threshold element having its input connected to the supply-line voltage transducer and its output connected to the information recorder, the output of the supply-line voltage transducer being advisably connected to the input of the second adder comprised in the circuit used to determine the effect of a varying consumable-electrode feed rate.

It is further advantageous that the logic analyzer should comprise a circuit used to determine the effect of a supply-line voltage and incorporating a supply-line voltage adder whose input is connected to the supply-line voltage transducer, and a supply-line voltage switch connected to the output of the unit for generating a signal proportional to welding voltage and to the output of the supply-line voltage adder, the outputs of said switch being connected to the input of said adder and to the input of the welding voltage comparator, the output of the switch comprised in the circuit used to determine the effect of a supply-line voltage being desirably connected to the input of the welding voltage adder.

It is preferable that the monitor in compliance with the invention should comprise a unit for generating a signal proportional to welding energy per unit of length along the weld seam ("per unit length welding energy"), its inputs being connected to the outputs of the unit for generating a signal proportional to welding current, the unit for generating a signal proportional to welding voltage and the unit for generating a signal proportional to welding speed, while the output of the unit for generating a signal proportional to per-unit length welding energy is connected to the input of the logic analyzer, a per-unit length welding energy comparator, one input of which is connected to the output of the unit for generating a signal proportional to per-unit length welding energy and whose other input receives a per-unit length welding energy setting signal, while the output of the per-unit length welding energy comparator is connected to the input of the information recorder and to the input of the logic analyzer comprising a per-unit length welding energy switch having its input connected to the output of the per-unit welding energy comparator and its output serving as the output of the logic analyzer, and a per-unit length welding energy adder, one input of which is connected to the output of the unit for generating a signal proportional to per-unit length welding energy and whose other input receives said per-unit length welding energy setting signal, while the output thereof is simultaneously the output of the logic analyzer and is connected, in conjunction with the output of the per-unit length welding energy switch, to the input of the audio-signal generator.

To provide for coupling between the unit for generating a signal proportional to per-unit welding energy and the other units of the monitor, the logic analyzer preferably comprises a monitoring mode switch having its outputs connected to the inputs of the unit for generating a signal proportional to per-unit length welding energy and its inputs connected to the respective units for generating signals proportional to welding current and voltage and to the circuit used to determine the effect of a varying consumable-electrode feed rate and the effect of a supply-line voltage.

Furthermore, the monitor forming the subject of the present invention advantageously includes a unit for generating a monitored welding parameter setting signal, while the logic analyzer comprises means for switching a setting signal of a respective monitored parameter, the outputs of which act as the outputs of the logic analyzer, a setting signal switching unit having its outputs connected to the inputs of the setting signal switches and its input connected to the output of the unit for generating a monitored welding parameter setting signal, and a present signal switching unit whose inputs are connected to the units for generating signals proportional to welding current, voltage and per-unit length welding energy, while its output is connected to the input of the unit for generating a monitored welding parameter setting signal.

The monitor according to the invention desirably comprises a transducer for measuring the slope between the electrode axis and normal to the surface of work pieces, which is connected to the logic analyzer having a slope switch connected via its input to the output of the slope transducer and via its output to the audio-signal generator and to the information recorder.

It is further preferable that the logic analyzer should comprise a write signal switch wherein one input is connected to the output of the slope transducer, the other input is connected to a write signal setting element and the output acts as the output of the logic analyzer and is connected to the input of the unit for generating a monitored signal setting signal.

It is also preferable that the monitor according to the invention should comprise a welding timer whose control input is connected to the output of the unit for generating a signal proportional to welding speed, and a gating element, one input of which is connected to the output of the welding timer and whose other input is connected to the output of the first threshold element, the outputs of the gating element and the welding timer being connected to the inputs of the information recorder and the logic analyzer comprising AND gates whose number corresponds to the number of monitored parameters, one input of each gate being connected to the respective comparator, the other input of each AND gate being connected to the output of the gating element, while the outputs thereof serve as the outputs of the logic analyzer and are connected to the information recorder.

Advantageously the audio-signal generator employs amplitude-frequency modulation and, according to the invention, comprises a means for converting voltage corresponding to an increment in monitored parameters into audio frequency a monitored parameter increment signal switch whose inputs are connected to the output of the signal switch responsive to an incremental change in monitored parameters and to the output of the signal subtraction circuit, while the output of the monitored monitored parameter increment signal switch is connected to the input of the voltage converter, a monitored parameter selection circuit connected via its inputs to the output of the signal switch responsive to variations of monitored parameters and to the output of the welding speed comparator and via its outputs to the control inputs of the monitored parameters increment signal switch; a multivibrator whose input is connected to the output of the monitored parameter selection circuit; and an audio-signal modulation circuit connected via its inputs to the outputs of the multivibrator and to the output of the voltage converter connected and via its control inputs to the outputs of the monitored parameter selection circuit and to the output of the first threshold element, while the outputs thereof act as the output of the audio-signal generator and are connected to the playback means.

It is also advantageous that the logic analyzer should comprise a modulation mode switch having its inputs connected to the outputs of the welding current, voltage and per-unit length welding energy adders and its output connected to the input of the voltage converter responsive to an increment in monitored parameters, while the monitored parameter selection circuit includes first and second AND gates, inputs of said gates serving as the inputs of the audio-signal generator, a chosen parameter transmission switch having its inputs connected to the outputs of the AND gates and to power lines transmitting logic 0 and 1 signals, a flip-flop whose inputs are connected to the outputs of the chosen parameter transmission switch, first and second output AND gates, first inputs of said gates being connected to the outputs of the flip-flop, a second input of the first named gate being connected to the output of the signal switch responsive to variations of monitored parameters, while a second input of the second named gate is connected to the output of the welding speed comparator, and an OR gate whose inputs are connected to the outputs of the first and second output AND gates, while its output is, at the same time, the output of the monitored parameter selection circuit, the audio-signal modulation circuit being preferably provided with two AND gates.

Advantageously the outputs of the audio-signal modulation circuit are connected to the inputs of two additional frequency modulation OR gates whose other inputs are connected to the output of an electrode slope multivibrator, the input of which is connected to the output of the slope switch. The monitored parameter selection circuit preferably includes two OR gates for selecting a signal indicative of per-unit length welding energy, first inputs of each gate being connected to the outputs of the flip-flop, second inputs of said gates being connected to the output of the per-unit length welding energy switch, which is also connected to the inputs of the first and second output AND gates, while the outputs of said signal selection OR gates serve as the outputs of the monitored parameter selection circuit, the input of the monitored parameter increment signal switch being connected to the output of the per-unit length welding energy adder.

It is further advantageous that the audio-signal generator should comprise a monitored parameter selection switch whose inputs are connected to the output of the signal switch responsive to variations of monitored parameters and to the output of the welding speed comparator, a monitored parameter address switch having its inputs connected to the outputs of the monitored parameter selection switch, to the output of the per-unit length welding energy switch, to the output of the slope switch, to the output of the welding speed comparator and to the output of the logic analyzer, a monitored parameter address counter whose complementing input and output are connected, respectively, to the control output and control input of the monitored parameter address switch, a storage storing codes of monitored parameters and connected via its inputs to the outputs of the monitored parameter address switch and to the outputs of the monitored parameter address counter, a converter used to convert a code into voltage corresponding to a monitored parameter, inputs of said code-to-voltage converter being connected to the outputs of the storage, and an AND gate for gating an output signal, one input of which is connected to the output of the code-to-voltage converter and whose other input is connected to the output of the first threshold element, while the output thereof acts as the output of the audio-signal generator.

It is also preferable that the unit for generating a monitored parameter setting signal should comprise a monitored parameter comparator one input of which is connected to the logic analyzer first and second flip-flops for recording variations of monitored parameters from preset values, data inputs of said flip-flops being connected to the outputs of the monitored parameter comparator, while their clock inputs are connected to a clock pulse generator; a counter storing variations of a monitored parameter from a preset value, the inputs of which are connected to the outputs of the first and second variation recording flip-flops, its clock input being connected to the output of the clock pulse generator; a second converter used to convert a code into voltage corresponding to a monitored parameter, inputs of said code-to-voltage converter being connected to the outputs of the variation counter, while its output serves as the output of the unit for generating a setting signal; two amplifiers, inputs of each amplifier being connected to the output of the second converter used to convert a code into voltage corresponding to a monitored parameter, while the outputs thereof are connected to the second inputs of the monitored parameter comparator; and a setting signal indication circuit whose data inputs are connected to the outputs of the variation counter, its control input being combined with the control input of the second code-to-voltage converter and connected to the output of the logic analyzer.

It is of advantage that the unit for generating a signal proportional to welding speed should include radiation sensors disposed along a monitored weld; a radiation signal switch whose data inputs are connected to the respective radiation sensors; a radiation signal gating element, first and second inputs of which are connected, respectively, to the output of the radiation signal switch and to the output of a pulse generator; a means for shaping a signal responsive to radiation, the input of said shaper being connected to the output of the radiation signal gating element and to the output of the pulse generator, while its output serves as the output of the unit for generating a signal proportional to welding speed; and a means for shaping the address of the radiation sensor, the input of said shaper being connected to the output of the means for shaping a signal responsive to radiation, its outputs being connected bit-by-bit to respective control inputs of the radiation signal switch, while the control output thereof is connected to the input of the radiation signal gating element.

BRIEF DESCRIPTION OF THE DRAWINGS

The invention will now be described further with reference to specific embodiments thereof, taken in conjunction with the accompanying drawings, wherein.

DESCRIPTION OF THE PREFERRED EMBODIMENTS

Figure 1:
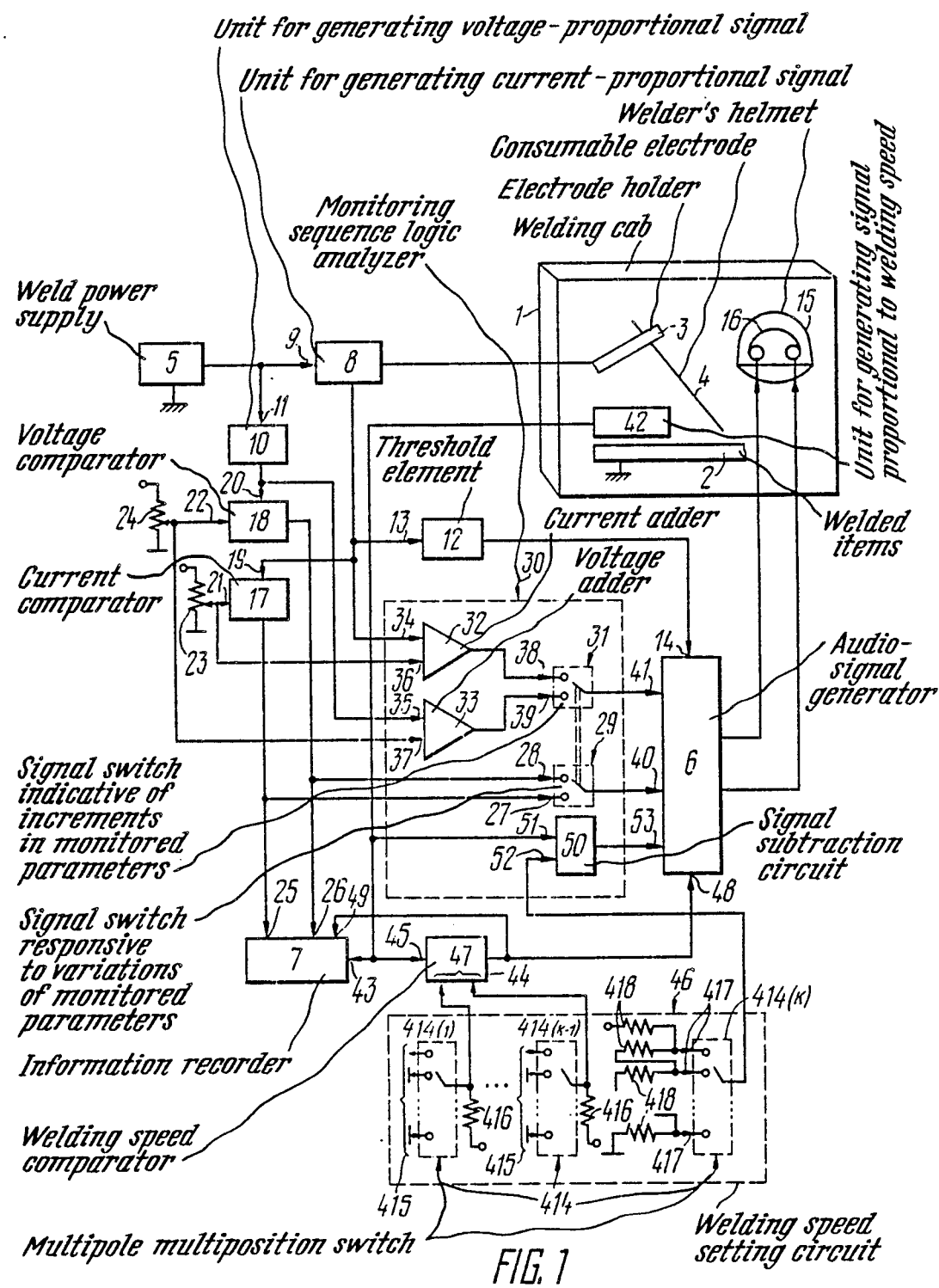
FIG. 1 shows an arc-welding monitor according to the invention.

An arc-welding monitor in compliance with the invention comprises a welder's cab 1 (FIG. 1) accommodating work pieces 2 and an electrode holder 3 with a consumable electrode 4, a weld power supply 5 electrically connected with the electrode 4, an audio-signal generator 6 producing audio signals indicative of welding parameters, and an information recorder 7. The proposed monitor further comprises a unit 8 for generating a signal proportional to welding current, which is connected via an input 9 to the output of the power supply 5 and coupled to the electrode 4, a unit 10 for generating a signal proportional to welding voltage, which is connected via an input 11 to the output of the power supply 5, and threshold element 12 having its input 13 connected to the output of the unit 8 and its output connected to an input 14 of the audio signal generator 6.

Welding monitoring signals are applied simultaneously to the information recorder 7 and as audio tones from the generator 6 to a welding operator's helmet 15 with a playback means 16.

In compliance with the invention the monitor also includes a welding current comparator 17 and a welding voltage comparator 18 whose inputs 19 and 20 are connected to the outputs of the units 8 and 10, respectively. Inputs 21 and 22 of the comparators 17 and 18 receive, respectively, welding current and voltage setting signals shaped by resistors 23 and 24, respectively. The outputs of the comparators 17 and 18 are connected, respectively, to inputs 25, 26 of the information recorder 7 and to inputs 27, 28 of a signal switch 29 responsive to variations of monitored parameters, which is comprised in a monitoring sequence logic analyzer 30.

The logic analyzer 30 also comprises a signal switch 31, responsive to incremental variations of monitored parameters, and welding current and voltage adders 32 and 33, respectively. Inputs 34 and 35 of the adders 32 and 33 are connected, respectively, to the output of the unit 8 and to the output of the unit 10. Inputs 36 and 37 of the adders 32 and 33 are combined, respectively, with the input 21 of the welding current comparator 17 and with the input 22 of the welding voltage comparator 18, while the outputs thereof are connected, respectively, to inputs 38 and 39 of the switch 31. The outputs of the switches 29 and 31, acting as the outputs of the logic analyzer 30, are connected to inputs 40 and 41 of the audio signal-generator 6, respectively.

The proposed monitor further comprises a unit 42 for generating a signal proportional to welding speed, which is connected to an input 43 of the information recorder 7.

The monitor according to the invention also includes a welding speed comparator 44 whose input 45 is connected to the unit 42 and a welding speed setting circuit 46 having its output connected to inputs 47 of the welding speed comparator 44 whose output is connected to an input 48 of the audio-signal generator 6 and to an input 49 of the unit 7. The welding speed setting logic analyzer 30 comprises a signal subtraction circuit 50 whose inputs 51 and 52 are connected, respectively, to the output of the unit 42 and to the output of the welding speed setting circuit 46, while its output is connected to an input 53 of the audio-signal generator 6.

In mechanized arc welding carried out by the use of a welding torch 54 (FIG. 2) with a mechanism 55 for feeding the consumable electrode 4 representing electrode wire, the monitor according to the invention comprises such series-connected components as a sensor 56 for measuring the feed rate of the consumable electrode 4, which is connected with the electrode feeding mechanism 55, a unit 57 for generating a signal proportional to the feed rate of the consumable electrode 4, which is connected to the output of the sensor 56, and a consumable-electrode feed rate comparator 58 whose input 59 receives a welding current setting signal, while its output is connected to an input 60 of the information recorder 7.

Moreover, the logic analyzer 30 includes a circuit 61 used to determine the effect of a varying consumable-electrode feed rate, which comprises a consumable-electrode feed rate switch 62 whose inputs 63 and 64 are combined and connected to the output of the unit 8.

The circuit 61 includes an adder 65 wherein an input 66 receives a welding current setting signal taken from the wiper of the resistor 23 and an input 67 is connected to a switch 68 whose input 69 is connected to the output of the unit 57, while its input 70 accepts a welding current setting signal taken from the wiper of the resistor 23. The output of the adder 65 is connected to an input 71 of an adder 72 whose input 73 is connected to the output of the switch 62, while its output is connected to an input 74 of the same switch 62 whose input 75 is grounded.

Also, the output of the switch 62 is connected to the input 34 of the welding current adder 32.

The monitor forming the subject of the present invention further comprises a supply-line voltage transducer 76 (FIG. 3) whose input 77 is connected to the supply line of the weld power supply 5 and a threshold element 78 having its input 79 connected to the supply-line voltage transducer 76 and its output connected to an input 80 of the information recorder 7.

Furthermore, the output of the supply-line voltage transducer 76 is connected to an input 81 of the adder 72 comprised in the logic analyzer 30.

The logic analyzer 30 includes a circuit 82 used to determine the effect of a supply-line voltage, which incorporates a supply-line voltage adder 83 connected via an input 84 to the supply-line voltage transducer 76 and a supply-line voltage switch 85 whose inputs 86 and 87 are connected to the output of the unit 10, an input 88 being connected to the output of the supply-line voltage adder 83, while an input 89 is grounded. The outputs of the switch 8 are connected, respectively, to an input 90 of the supply-line voltage adder 83 and to the input 20 of the welding voltage comparator 18.

Moreover, the output of the switch 85 is connected to the input 35 of the welding voltage adder 33.

Figure 4:
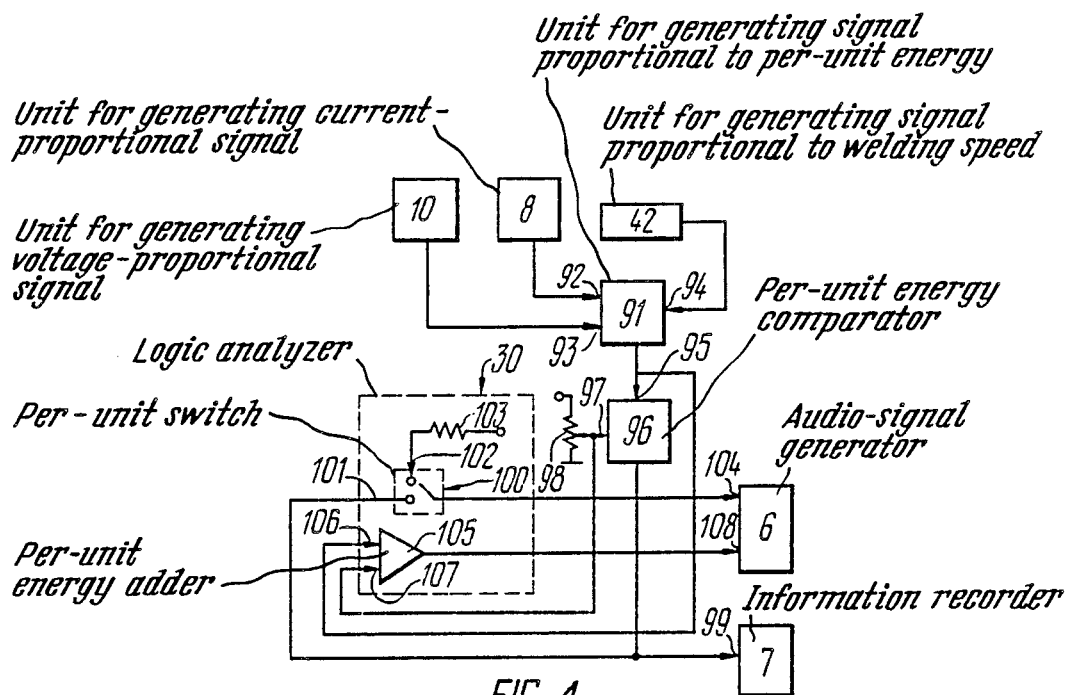
FIG. 4 shows the same monitor providing for per-unit length welding energy monitoring according to the invention.

A preferred embodiment of the invention illustrated in FIG. 4 is used to monitor welding energy per unit of length along the weld seam ("per unit length welding energy"). It comprises a unit 91 for generating a signal proportional to per-unit length welding energy, inpits 92, 93 and 94 of which are connected to the outputs of the units 8, 10 and 42, respectively. The output of the unit length 91 is connected to an input 95 of a per-unit welding energy comparator 96 whose input 97 receives a per-unit length welding energy setting signal furnished by a resistor 98. The output of the per-unit length welding energy comparator 96 is connected to an input 99 of the information recorder 7. In the preferred embodiment of the invention the logic analyzer 30 comprises a per-unit length welding energy switch 100 wherein an input 101 is connected to the output of the per-unit length welding energy comparator 96, an input 102 receives a logic 1 signal derived from a resistor 103 and its output serves as the output of the logic analyzer 30 and is connected to an input 104 of the audio-signal generator 6. The logic analyzer 30 also includes a per-unit length energy adder 105 connected via an input 106 to the output of the unit 91, its input 107 receiving a per-unit length welding energy setting signal taken from the wiper of the resistor 98. The per-unit length energy output of the adder 105 serving as the output of the logic analyzer 30 is connected to an input 108 of the audio-signal generator 6.

Figure 5:
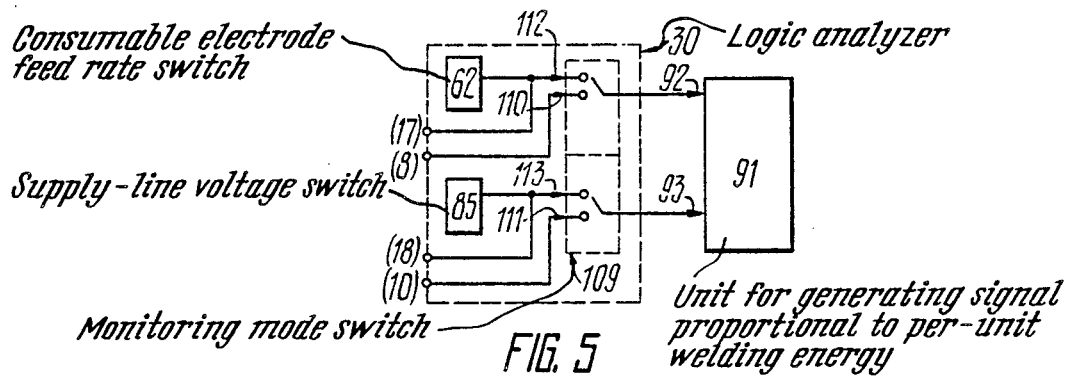
FIG. 5 shows the same monitor ensuring different conditions for generating a signal proportional to per-unit welding energy according to the invention.

To provide for coupling between the unit 91 and the other units of the monitor, the logic analyzer 30 further comprises a monitoring mode switch 109 (FIG. 5) whose outputs are connected to the inputs 92 and 93 of the unit 91. Inputs 110 and 111 of the monitoring mode switch 109 are connected to the outputs of the units 8 and 10, respectively, while inputs 112 and 113 thereof are connected, respectively, to the output of the consumable electrode feed-rate switch 62 which is connected to the input 19 (FIG. 1) of the welding current comparator 17 and to the output of the supply line voltage switch 85 (FIG. 5) which is connected to the input 20 (FIG. 1) of the welding voltage comparator 18.

Figure 6:
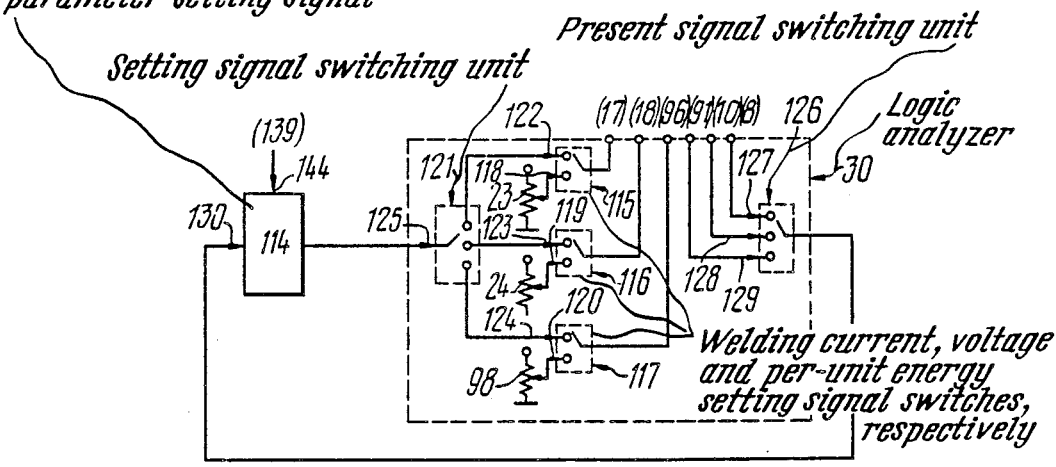
FIG. 6 show connection of a unit for generating a setting signal according to the invention.

FIG. 6 illustrates another embodiment of the monitor comprising a unit 114 for generating a monitored welding parameter setting signal. In the illustrated embodiment the logic analyzer 30 includes welding current, voltage and per-unit length energy setting signal switches 115, 116 and 117, respectively, inputs 118, 119 and 120 of said switches receiving setting signals derived, respectively, from the resistors 23, 24 and 98. The outputs of the switches 115, 116 and 117 are simultaneously the outputs of the logic analyzer 30 and are connected, respectively, to the inputs 21, 22 and 97 of the comparators 17, 18 and 96. The logic analyzer 30 further includes a setting signal switching unit 121 whose outputs are connected to inputs 122, 123 and 124 of the switches 115, 116 and 117, respectively, its input 125 being connected to the output of the unit 114. The logic analyzer 30 also comprises a present signal switching unit 126 whose inputs 127, 128 and 129 are connected to the outputs of the units 8, 10 and 91, respectively. The output of the present signal switching unit 126 acting as the output of the logic analyzer 30 is connected to an input 130 of the unit 114.

Figure 7:
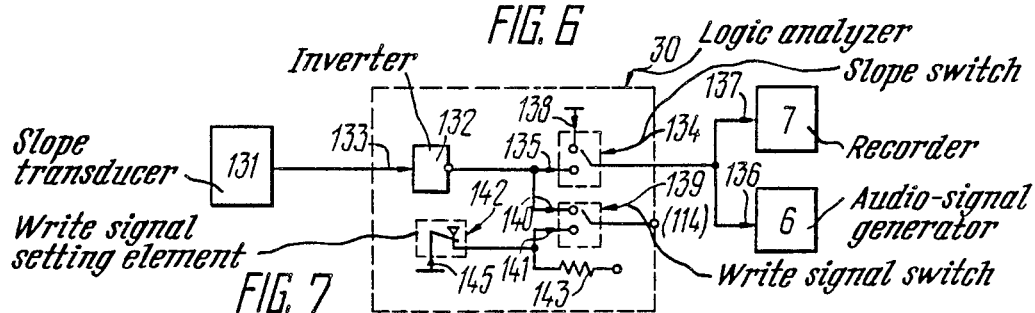
FIG. 7 shows connection of a transducer for measuring slope between electrode axis and normal to surfaces of work pieces according to the invention.

Connected to the monitor in the embodiment of FIG. 7 is a transducer 131 for measuring the slope between electrode axis and normal to surfaces of work pieces. In the illustrated embodiment the logic analyzer 30 comprises an inverter 132 whose input 133 is connected to the output of the transducer 131 and a slope switch 134 connected via an input 135 to the output of the inverter 132 and via its output to an input 136 of the audio-signal generator 6 and to an input 137 of the information recorder 7. An input 138 of the switch 134 is grounded.

Moreover, the logic analyzer 30 includes a write signal switch 139 whose input 140 is connected to the output of the transducer 131, while its input 141 is connected to the output of a write signal setting element 142, a logic 1 signal being produced therein by the use of a resistor 143. The output of the write signal switch 139 acting as the output of the logic analyzer 30 is connected to an input 144 (FIG. 6) of the unit 114. An input 145 (FIG. 7) of the write signal setting element 142 is grounded.

Figure 8:
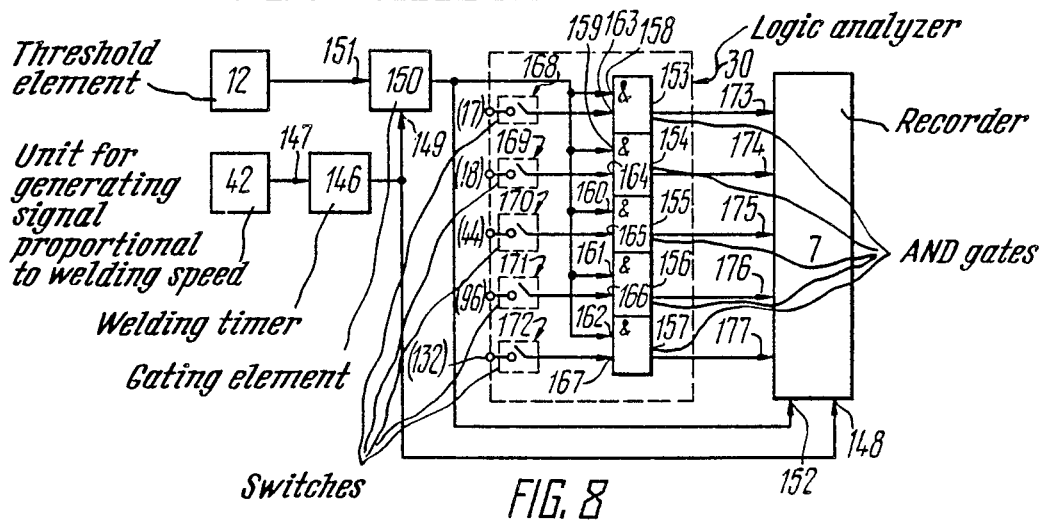
FIG. 8 shows connection of a welding timer according to the invention.

Turning now to FIG. 8 there is shown connection of a welding timer 146. In the illustrated embodiment a control input 147 of the welding timer 146 is connected to the output of the unit 42 and the output of the welding timer 146 is connected to an input 148 of the information recorder 7 and to an input 149 of a gating element 150, an input 151 of which is connected to the output of the threshold element 12, while its output is connected to an input 152 of the information recorder 7. The logic analyzer 30 includes AND gates 153, 154, 155, 156 and 157 whose inputs 158, 159, 160, 161 and 162 are connected to the output of the gating element 150, while inputs 163, 164, 165, 166 and 167 are connected by the use of switches 168, 169, 170, 171 and 172, respectively, to the outputs of the welding current comparator 17, the welding voltage comparator 18, the welding speed comparator 44, the per-unit length welding energy comparator 96 and the inverter 132, the outputs of the AND gates 153 to 157 serving as the outputs of the logic analyzer 30 and being connected to inputs 173, 174, 175, 176, 177 of the information recorder 7.

In the proposed monitor the audio-signal generator 6 (FIG. 9) comprises a means 178 for converting voltage corresponding to an increment of a monitored parameter into audio frequency and a monitored parameter increment signal switch 179 whose inputs 180 and 181 are connected, respectively, to the output of signal switch 31 and to the output of the signal subtraction circuit 50, while its output is connected to an input 182 of the converter 178. The audio-signal generator 6 also includes a monitored parameter selection circuit 183 connected via an input 184 to the output of the signal switch 29 and via an input 185 to the output of the welding speed comparator 44, while the output of the monitored parameter selection circuit 183 is connected to an input 186 of a multivibrator 187. The audio-signal generator 6 further comprises an audio-signal modulation circuit 188 connected via inputs 189, 190 to the output of the multivibrator 187, via inputs 191, 192 to the output of the voltage converter 178, via control inputs 193, 194 to the output of the monitored parameter selection circuit 183, which is also connected to control inputs 195, 196 of the switch 179, and via control inputs 197, 198 to the output of the threshold element 12.

The outputs of the audio-signal modulation circuit 188 serve as the outputs of the audio-signal generator 6 and are connected to the playback means 16. In the preferred embodiment of the invention the logic analyzer 30 comprises a monitoring mode selection switch 199 wherein inputs 200 and 201 are combined and adapted to receive a logic 1 signal derived from a resistor 202, inputs 203 and 204 are combined and suitably grounded and the outputs acting as the outputs of the logic analyzer 30 are connected to inputs 205 and 206 of the monitored parameter selection circuit 183.

The logic analyzer 30 further comprises a modulation mode switch 207 connected via inputs 208, 209, 210 to the outputs of the current, voltage and per-unit length energy adders 32, 33 and 105, respectively, and via its output to an input 211 of the voltage converter 178.

In the audio-signal generator 6, the monitored parameter selection circuit 183 (FIG. 10) includes AND gates 212 and 213, a direct input 214 of the AND gate 212 and an inverting input 215 of the AND gate 213 being connected to the input 184 of the monitored parameter selection circuit 183, while an inverting input 216 of the AND gate 212 and a direct input 217 of the AND gate 213 are connected to the input 185 of the monitored parameter selection circuit 183.

The monitored parameter selection circuit 183 also comprises a switch 218 whose control inputs 219 and 220 are connected to the inputs 205 and 206 of the monitored parameter selection circuit 183, data inputs 221 and 222 of the switch 218 being connected to the outputs of the AND gates 212 and 213, while data inputs 223 and 224 of the switch 218 are combined and connected to a power line passing a logic 0 signal, data inputs 225 and 226 of the switch 218 being connected to a power line transmitting a logic 1 signal. The outputs of the switch 218 are connected to inputs 227 and 228 of a flip-flop 229 whose output are connected to inputs 230 and 231 of output AND gates 232 and 233, respectively, inputs 234 and 235 of said gates being connected, respectively, to the direct inputs 214 and 217 of the AND gates 212 and 213. The outputs of the AND gates 232 and 233 are connected, respectively, to inputs 236 and 237 of an OR gate 238 whose output serves as the output of the monitored parameter selection circuit 183 and is connected to the input 186 of the multivibrator 187.

Moreover, the audio-signal modulation circuit 188 comprised in the audio-signal generator 6 includes AND gates 239 and 240. The inputs and output of the AND gate 239 serve simultaneously as the inputs 189, 191, 193, 197 and the output of the circuit 188. The inputs and output of the AND gate 240 serve simultaneously as the inputs 190, 192, 194, 198 and the output of the circuit 188.

Connected to the outputs of the circuit 188 in the audio-signal generator 6 are also inputs 241 and 242 of OR gates 243 and 244, inputs 245 and 246 of which are connected to the output of an electrode slope multivibrator 247 whose input 248 is connected to the output of the slope switch 134.

The monitored parameter selection circuit 183 of the audio-signal generator 6 further comprises OR gates 249 and 250 for selecting a signal indicative of per-unit length welding energy, in which inputs 251 and 252 are connected to the outputs of the flip-flop 229, while inputs 253 and 254 are connected to the output of the per-unit length welding energy switch 100 which is also connected to inputs 255 and 256 of the output AND gates 232 and 233. The outputs of the OR gates 249 and 250 act as the outputs of the monitored parameter selection circuit 183 and are connected to the control inputs 195 and 196 of the switch 179. Connected to an input 257 of the switch 179 is the output of the per-unit length energy adder 105.

Figure 11:
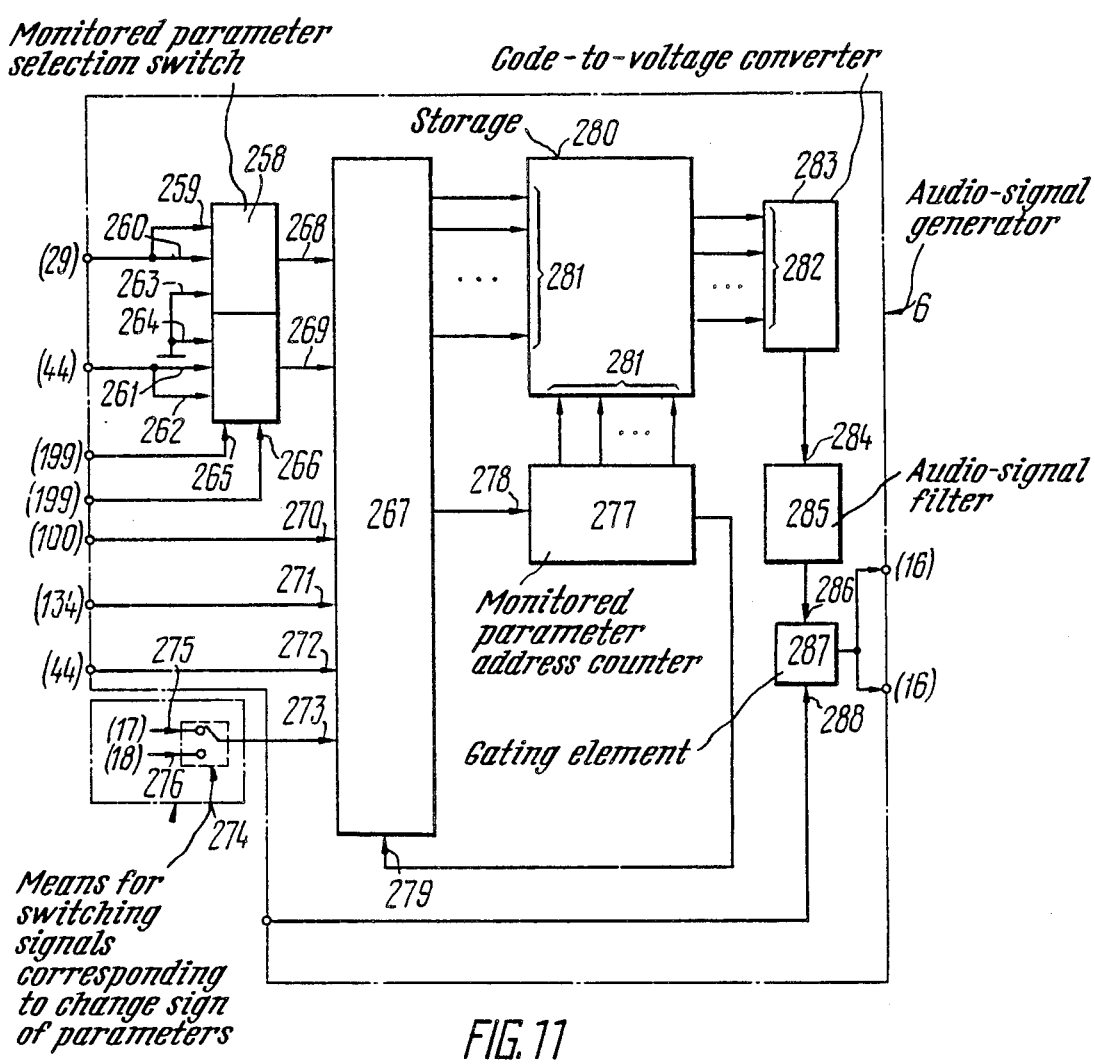
FIG. 11 shows the same generator providing the welder with worded feedback according to the invention.

Another embodiment of the audio-signal generator 6 is illustrated in FIG. 11. Referring to the drawing, it comprises a monitored parameter selection switch 258 wherein inputs 259 and 260 are connected to the output of the signal switch 29, inputs 261 and 262 are connected to the output of the welding speed comparator 44, inputs 263 and 264 are grounded, and control inputs 265, 266 are connected to the outputs of the switch 199. The audio-signal generator 6 further comprises a monitored parameter address switch 267 having inputs 268, 269 connected to the outputs of the switch 258, an input 270 connected to the output of the switch 100, an input 271 connected to the output of the slope switch 134, an input 272 connected to the output of the welding speed comparator 44, and an input 273 connected to the output of a signal switch 274 indicative of a variation sign of monitored parameters, input 275 and 276 of said switch being connected to the outputs of the welding current and welding speed comparators 17 and 18, respectively. In the preferred embodiment of the invention the audio-signal generator 6 also comprises a monitored parameter address counter 277 whose complementing input 278 and output are connected, respectively, to the control output and control input 279 of the switch 267. The audio-signal generator 6 further comprises a storage 280 holding codes of monitored parameters, which is connected via its inputs 281 to the outputs of the switch 267 and to the outputs of the counter 277, while the outputs of the storage 280 are connected to inputs 282 of a means 283 for converting code into voltage corresponding to a monitored parameter. The output of the code-to-voltage converter 283 is connected to an input 284 of an audio-signal filter 285. The output of the filter 285 is connected to an input 286 of an output signal gating element 287 whose input 288 is connected to the output of the threshold element 12. The output of the output signal gating element 287 serving simultaneously as the output of the audio-signal generator 6 is connected to the playback means 16.

Figure 12:
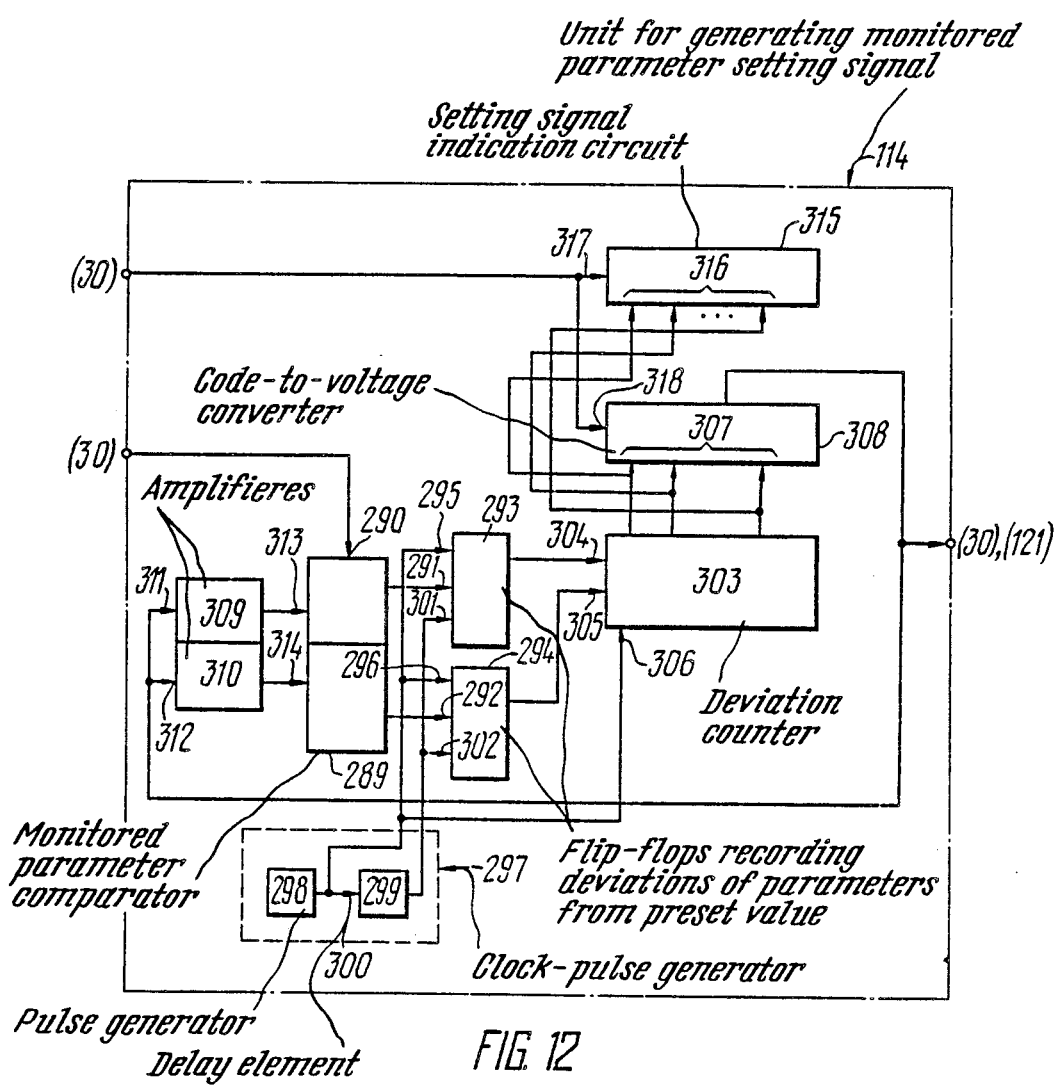
FIG. 12 depicts a unit for generating a setting signal according to the invention.

A preferred embodiment of the unit 114 for generating a monitored welding parameter setting signal is illustrated in FIG. 12. Referring to the drawing the unit 114 comprises a monitored parameter comparator 289 whose input 290 is connected to the output of the monitoring sequence logic analyzer 30 through the input 130 of the unit 114. The outputs of the comparator 289 are connected to data inputs 291 and 292 of respective flip-flops 293 and 294 for recording variations of a monitored parameter from a predetermined value, clock inputs 295 and 296 of said flip-flops being connected to the output of a clock pulse generator 297. The generator 297 comprises a pulse generator 298 and a delay element 299. The output of the pulse generator 298 is connected to the output of the clock pulse generator 297. The output of the pulse generator 298 is connected to an input 300 of the delay element 299, the output of which is connected to reset inputs 301 and 302 of the flip-flops 293 and 294. The unit 114 further comprises a counter 303 storing variations of a monitored parameter from a preset value, inputs 304 and 305 of said counter being connected to the outputs of the flip-flops 293 and 294, respectively, while a clock input 306 thereof is connected to the output of the pulse generator 298. The outputs of the counter 303 are connected to inputs 307 of a means 308 for converting code into voltage corresponding to a monitored parameter, the output of said code-to-voltage converter 308 being simultaneously the output of the unit 114.

Furthermore, the unit 114 includes amplifiers 309 and 310 having its inputs 311 and 312 connected to the output of the converter 308 and its outputs connected to inputs 313 and 314 of the monitored parameter comparator 289. The unit 114 also comprises a setting signal indication circuit 315 whose data inputs 316 are connected to the outputs of the counter 303, while its control input 317 is combined with a control input 318 of the converter 308 and connected to the output of the logic analyzer 30.

Figure 13:
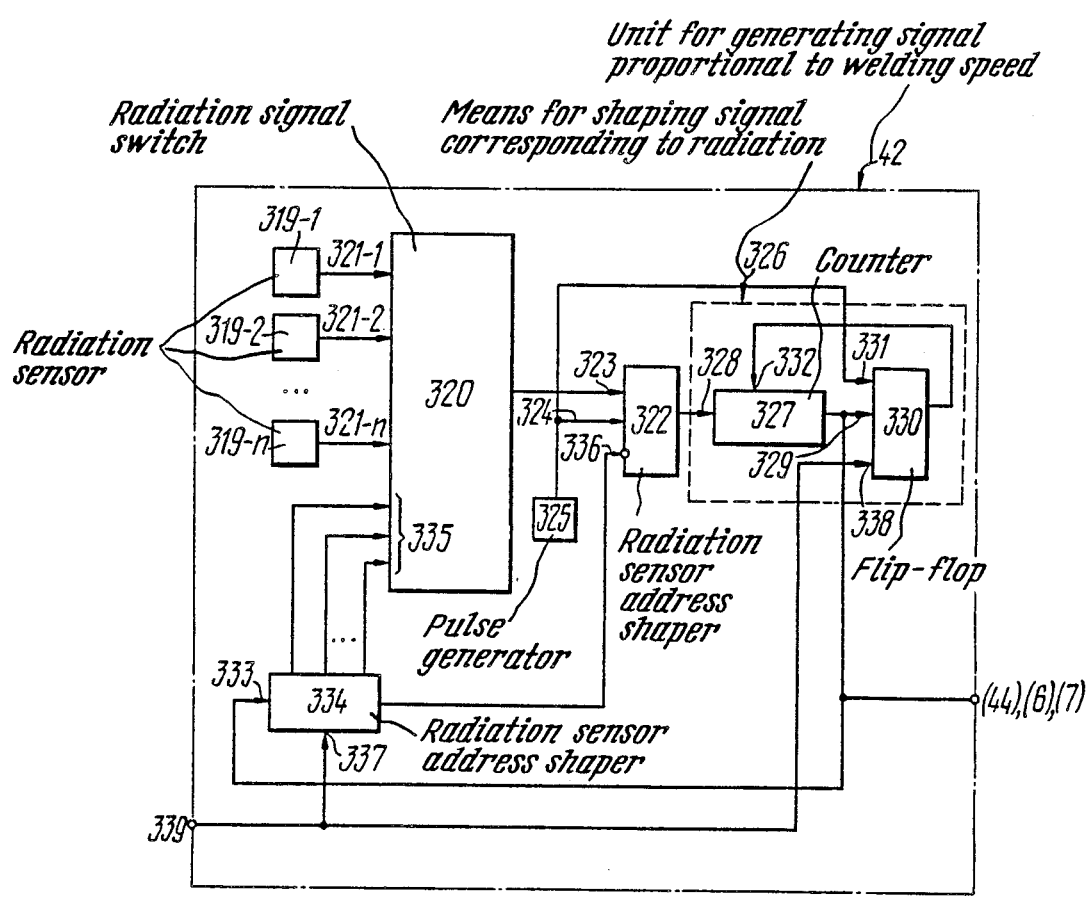
FIG. 13 shows a unit for generating a signal proportional to welding speed according to the invention.

FIG. 13 shows a preferred embodiment of the unit 42 for generating a signal proportional to welding speed. Referring to the drawing the unit 42 comprises radiation sensors (319-1, 319-2, . . . , 319-n) disposed along a monitored weld and a radiation signal switch 320 whose data inputs (321-1, 321-2, . . . , 321-n) are connected to the respective radiation sensors 319. The unit 42 further comprises a radiation signal gating element 322, inputs 323 and 324 of which are connected, respectively, to the output of the switch 320 and to the output of a pulse generator 325. The unit 42 also includes a means 326 for shaping a signal indicative of radiation, which comprises a counter 327, a clock input 328 of which is connected to the output of the element 322, while its complementing output is connected to a data input 329 of a flip-flop 330 whose clock input 331 is connected to the output of the pulse generator 325. The output of the flip-flop 330 is connected to a reset input 332 of the counter 327 whose complementing output serves as the output of the unit 42 and is connected to an input 333 of a means 334 for shaping the address of the radiation sensors 319. The outputs of the shaper 334 are connected to respective control inputs 335 of the switch 320, while its control output is connected to an input 336 of the element 322. Control inputs 337 and 338 of the shaper 334 and the flip-flop 330, respectively, are combined and connected to the set input of the unit 42.

The welder's cab 1 may be constructed in any known manner.

The welded items 2 may be work pieces suitable for butt, corner, tee and lap joints.

The electrode holder 3 may be any device suitable for manual consumable-electrode arc welding.

The consumable electrode 4 may be any electrode suitable for manual arc welding.

The welding power supply 5 may be any source suitable for consumable-electrode arc welding.

Figure 14:
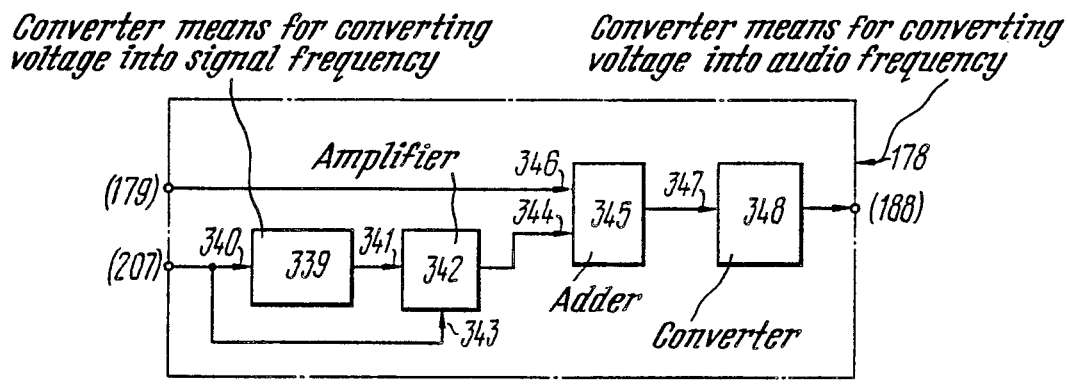
FIG. 14 shows a means for converting voltage corresponding to an increment in a monitored parameter into audio frequency according to the invention.

The means 178 for converting voltage indicative of incremental changes in a monitored parameter into audio frequency may be constructed as illustrated in FIG. 14. Referring to the drawing said means 178 comprises a voltage-to-frequency converter 339 whose input 340 is connected to the output of the switch 207, the output of the converter 339 being connected to an input 341 of an amplifier 342 whose control input 343 is combined with the input 340 of the converter 339. The output of the amplifier 342 is connected to an input 344 of an adder 345, an input 346 of which is simultaneously the input 182 of the voltage converter 178, while its output is connected to an input 347 of a voltage-to-frequency converter 348. The output of the converter 348, acting as the output of the converter 178, is connected to the inputs of the audio-signal modulation circuit 188.

The voltage-to-frequency converters 339 and 348 may be constructed in any known manner.

The amplifier 342 may use a known controlled-gain amplifier circuit. The adder 345 may employ a known analog adder circuit. The switch 179 may be a known analog signal switch. The switch 199 may use a known circuit comprising two independent two-position switches.

The switch 218 may be a known digital signal switch.

The switches 258 and 267 may be known digital switches. The signal switch 274 may be a known three-position switch.

The counter 277 may be a binary device. The storage 280 may be a known multiple-address storage device.

The code-to-voltage converter 283 may be a known digital-to-analog converter.

The audio-signal filter 285 may be constructed in any known manner.

The output signal gating element 287 may be a known AND gate.

The information recorder 7 may be any analog and digital recorder.

Figure 15:
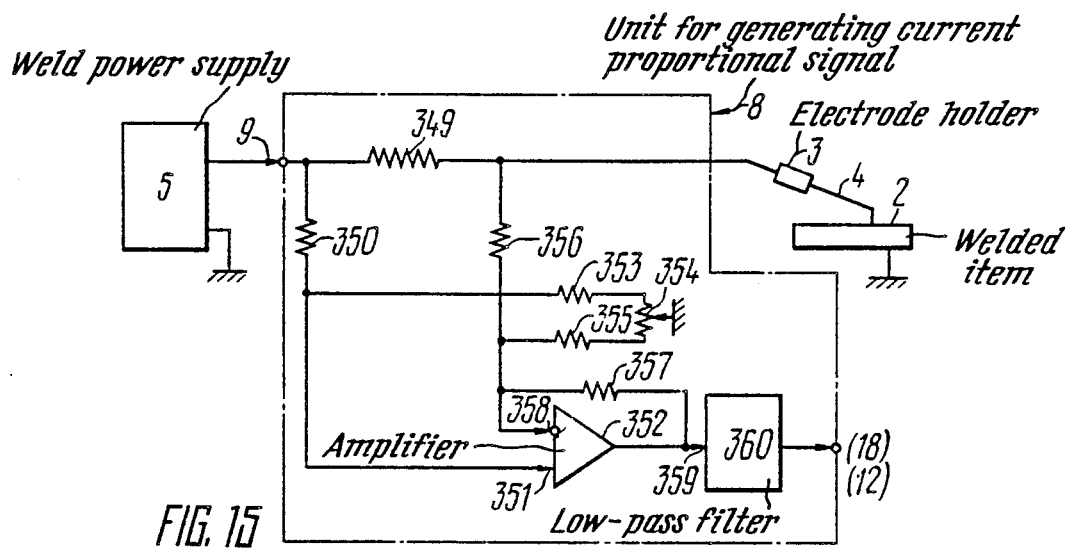
FIG. 15 shows a unit for generating a signal proportional to welding current according to the invention.

The unit 8 for generating a signal proportional to welding current may be constructed as shown in FIG. 15. Referring to the drawing the unit 8 comprises a resistance current transducer 349 inserted in a welding circuit, a first lead of said transducer being connected to the input 9 of said unit and to a first lead of a resistor 350, a second lead of the resistor 350 being combined with a direct input 351 of a differential amplifier 352 and with a resistor 353, a variable resistor 354 and a resistor 355, said resistors being placed in series. The wiper of the variable resistor 354 is grounded. A second lead of the transducer 349 is combined with the lead of a resistor 356 whose second lead is combined with the resistor 355, a resistor 357 and an inverting input 358 of the amplifier 352. The output of the amplifier 352 is combined with a second lead of the resistor 357 and with an input 359 of a low-pass filter 360. The output of the filter 360 serves simultaneously as the output of the unit 8 and is connected to the input of the welding voltage comparator 18 and to the input of the threshold element 12.

The resistance current transducer 349 may be a known device, more specifically, a shunt.

The differential amplifier 352 may be any known amplifier.

Figure 16:
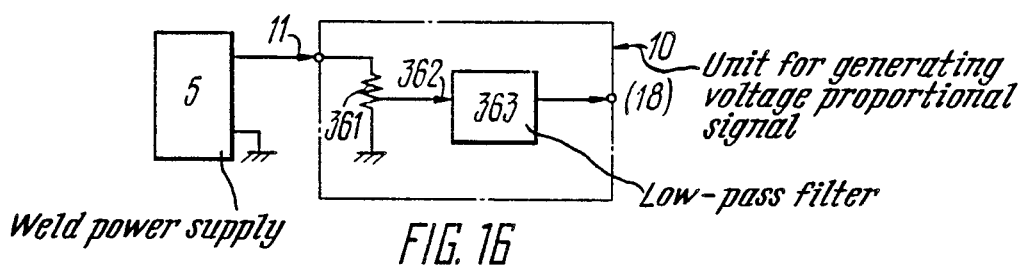
FIG. 16 shows a unit for generating a signal proportional to welding voltage according to the invention.

The unit 10 for generating a signal proportional to welding voltage may be constructed as illustrated in FIG. 16. Referring to the drawing, the unit 10 comprises a variable resistor 361, a first lead of which is connected to the input 11 of the unit 10, while a second lead thereof is grounded. The wiper of the variable resistor 361 is connected to an input 362 of a low-pass filter 363. The output of the filter 363 acting as the output of the unit 10 is connected to the input of the welding voltage comparator 18.

The threshold element 12 may be a known element, more specifically, a Schmitt trigger.

The welding operator's helmet 15 may be any standard welder's helmet. The playback means 16 may be headphones with separately connected inserts.

Figure 17:
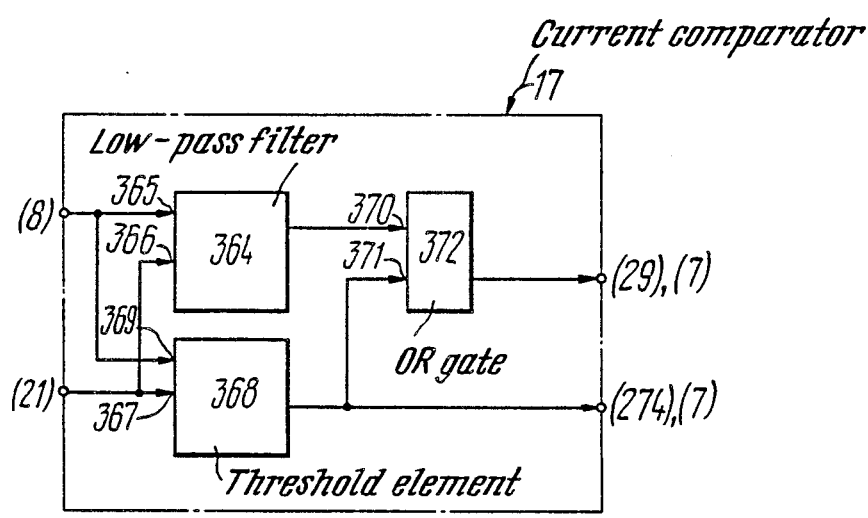
FIG. 17 depicts a welding current comparator.

The welding current, voltage, consumable-electrode feed rate and per-unit length welding energy comparators 17, 18, 58 and 96, respectively, may be constructed as illustrated in FIG. 17. More specifically, the welding current comparator 17 according to the invention comprises a threshold element 364 whose direct input 365 is connected to the input of the unit 8 receiving a present welding current signal, while its inverting input 366 is connected to the input 21 receiving a welding current setting signal. Connected to the input 21 of the welding current comparator 17 is a direct input 367 of a threshold element 368 whose inverting input 369 is combined with the input 365 of the threshold element 364, the output thereof acting as the output of the welding current comparator 17 and being connected to the information recorder 7 and to the switch 274. Connected to the threshold elements 364 and 368 are inputs 370 and 371 of an OR gate 372 whose output serves simultaneously as the output of the comparator welding current 17 and is connected to the input of the information recorder 7 and to the input of the signal 29.

The threshold elements 364 and 368 may be known analog signal threshold elements. The switches 29 and 31 may be known externally switched two-position switches. The adders 32 and 33 may be known analog adders.

The radiation sensors 319 may be known devices, more specifically, photodiodes. The switch 320 may be a known analog switch. The radiation signal gating element 322 may be a known AND gate. The counter 327 and the shaper 334 may be known binary counters.

Figure 18:
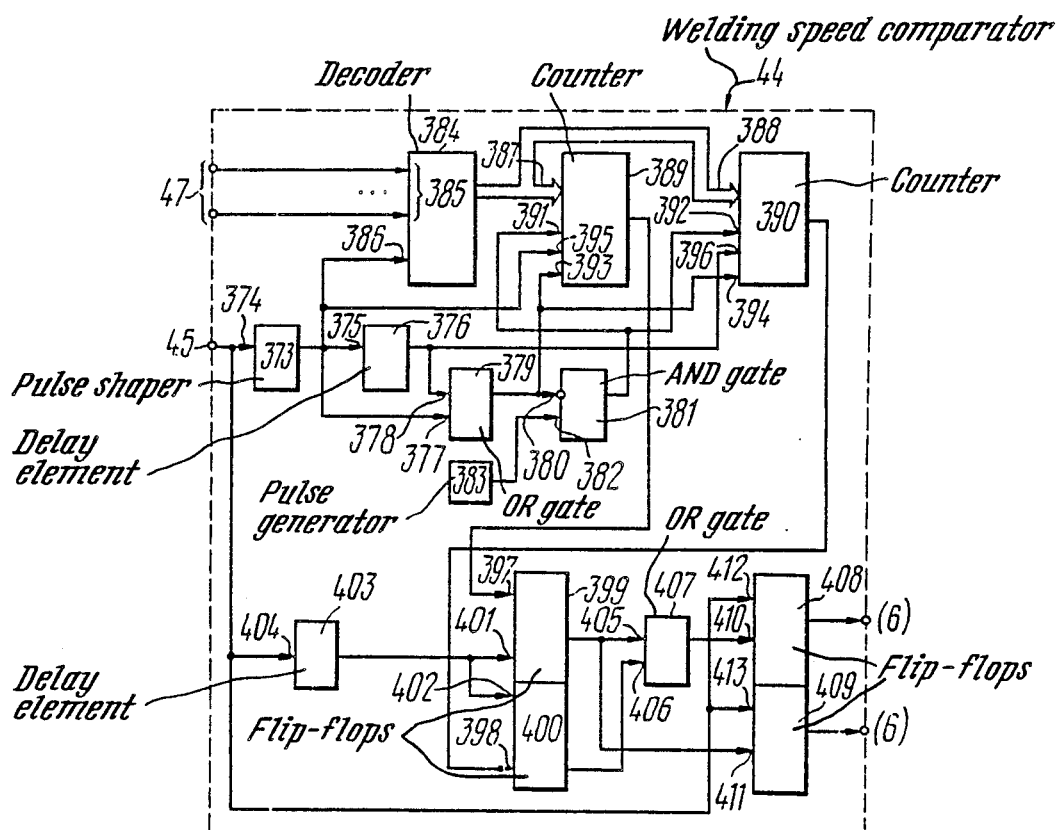
FIG. 18 depicts a welding speed comparator.

The welding speed comparator 44 may be constructed as illustrated in FIG. 18. The comparator 44 comprises a pulse shaper 373 having its input 374 connected to the input 45 of the comparator 44 and its output connected to an input 375 of a delay element 376. The output of the pulse shaper 373 and the output of the delay element 376 are connected to respective inputs 377 and 378 of an OR gate 379 whose output is connected to an inverting input 380 of an AND gate 381. The output of a pulse generator 383 is connected to a direct input 382 of the AND gate 381.

The welding speed comparator 44 further comprises a decoder 384 wherein inputs 385 are connected to the inputs 47 of the comparator 44 and an input 386 is connected to the output of the pulse shaper 373, while the outputs of the decoder 384 are connected bit-by-bit to respective data inputs 387 and 388 of counters 389 and 390. Clock inputs 391 and 392 of the respective counters 389 and 390 are combined and connected to the output of the AND gate 381.

Control inputs 393 and 394 of the counters 389 and 390, respectively, are connected to the output of the OR gate 379. A set input 395 of the counter 389 is connected to the output of the pulse shaper 373. A set input 396 of the counter 390 is connected to the output of the delay element 376. The carry outputs of the counters 389 and 390 are connected, respectively, to set inputs 397 and to reset inputs 398 of flip-flops 399 and 400 whose reset inputs, 401 and set inputs 402 are combined and connected to the output of a delay element 403. An input 404 of the delay element 403 is connected to the input 45 of the comparator 44. The inverting outputs of the flip-flops 399 and 400 are connected to inputs 405 and 406 of an OR gate 407.

In compliance with the invention the welding speed comparator 44 also includes flip-flops 408 and 409 whose data inputs 410 and 411 are connected, respectively, to the output of the OR gate 407 and to the inverting output of the flip-flop 399. Clock inputs 412 and 413 of the flip-flops 408 and 409, respectively, are combined and connected to the input 45 of the welding speed comparator 44. The outputs of the flip-flops 408 and 409 are simultaneously the outputs of the welding speed comparator 44. The pulse shaper 373 may use any known circuit. The generator 383 may be a known square-pulse generator. The decoder 384 may be a known digital signal decoder. The counters 389 and 390 may be known preset up-down binary counters.

The welding speed setting circuit 46 is designed as shown in FIG. 1. It comprises a multipole multiposition switch 414 wherein 414(1), . . . , 414(k−1) poles are used to develop at outputs thereof connected to the inputs 47 of the welding speed comparator 44 a digital welding speed setting signal by grounding respective inputs 415 of (k−1) poles and connecting said output to a power line through resistors 416, the pole 414(k) of the switch 414 being utilized for obtaining an analog welding speed setting signal by passing resistors 418 between inputs 417 of said pole and power lines (ground buses). The output of the pole 414(k) of the switch 414 is connected to the input 52 of the signal subtraction circuit 50.

Figure 19:
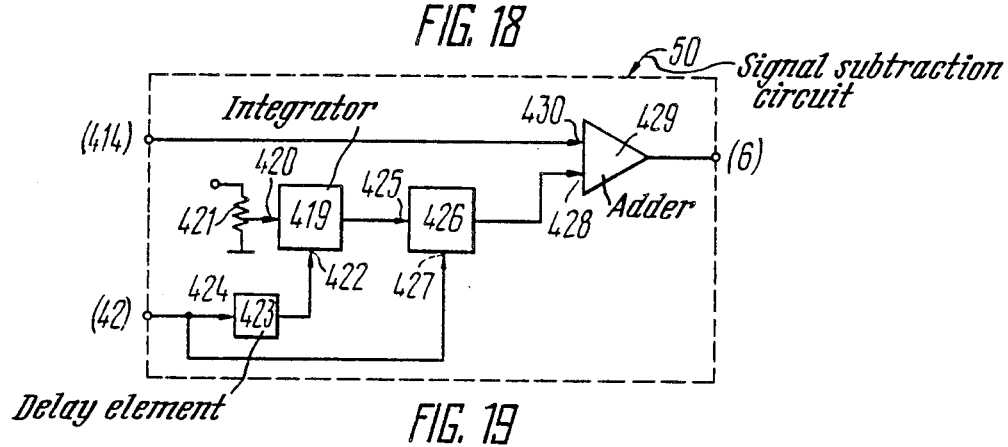
FIG. 19 is a diagram of a signal subtraction circuit.

The signal subtraction circuit 50 is designed as shown in FIG. 19. Referring to the drawing said circuit comprises an integrator 419 whose input 420 receives a signal derived from a resistor 421, a reset input 422 of the integrator 419 being connected to the output of a delay element 423 having its input 424 connected to the output of the unit 42. The output of the integrator 419 is connected to an input 425 of a storage and retrieval element 426 having its control input 427 connected to the input 51 and its output connected to an input 428 of an adder 429. An input 430 of the adder 429 serves as the input 52 (FIG. 1) of the signal subtraction circuit 50 and is connected to the output of the pole 414(k) of the switch 414 comprised in the welding speed setting circuit 46, while its output acts simultaneously as the output of the signal subtraction circuit 50 and is connected to the input 53 of the audio-signal generator 6.

The integrator 419 may be an analog reset integrator. The adder 429 may be a known analog adder.

The storage and retrieval element 426 may use a known circuit. The welding torch 54 may be any standard torch suitable for gas-shielded consummable-electrode arc welding. The consumable-electrode feeding mechanism 55 may be constructed in a known manner. The sensor 56 for measuring the feed rate of the consumable electrode 4 may be any angular speed sensor, more specifically, a tachogenerator. The unit 57 for generating a signal proportional to a consumable-electrode feed rate may be a known summing amplifier. The switch 62 may use known circuitry comprising two externally operated two-position switches.

The adders 65, 72 and 83 may be known analog adders. The switch 68 may be a known two-position switch. The supply-line voltage transducer 76 may be a known three-phase rectifier with a three-phase step-down transformer. The switch 85 may use a known circuit comprising externally operated two-position switches.

Figure 20:
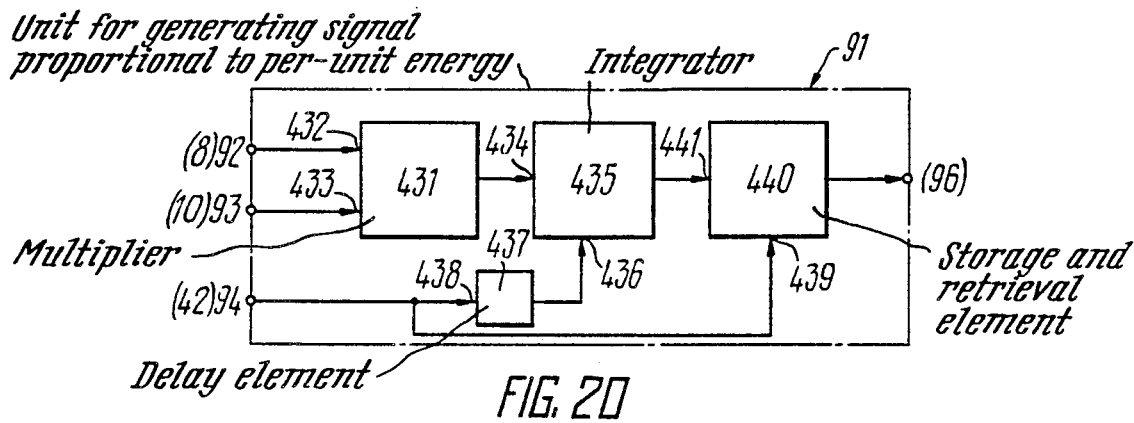
FIG. 20 shows a unit for generating a signal proportional to per-unit length welding energy.

The unit 91 for generating a signal proportional to per-unit length welding energy may be designed as shown in FIG. 20. Referring to the drawing the unit 91 comprises a multiplier element 431 whose inputs 432 and 433 are connected, respectively, to the inputs 92 and 93 of the unit 91. The output of the element 431 is connected to an input 434 of an integrator 435, a reset input 436 of which is connected to the output of a delay element 437. An input 438 of the element 437 is combined with a control input 439 of a storage and retrieval element 440 and connected to the input 94 of the unit 91. An input 441 of the storage and retrieval element 440 is connected to the output of the integrator 435, while its output serving as the output of the unit 91 is connected to the input of the per-unit length welding energy comparator 96.

The multiplier element 431 may be a known analog signal multiplier.

The integrator 435 may be an analog reset integrator. The storage and retrieval element 440 may use known circuitry.

The switch 100 may be a known two-position switch. The adder 105 may be an analog adder. The switch 109 may use a circuit comprising two two-position switches. The comparator 289 may be a two-level comparator. The generator 298 may be a square-pulse generator.

Figure 21:
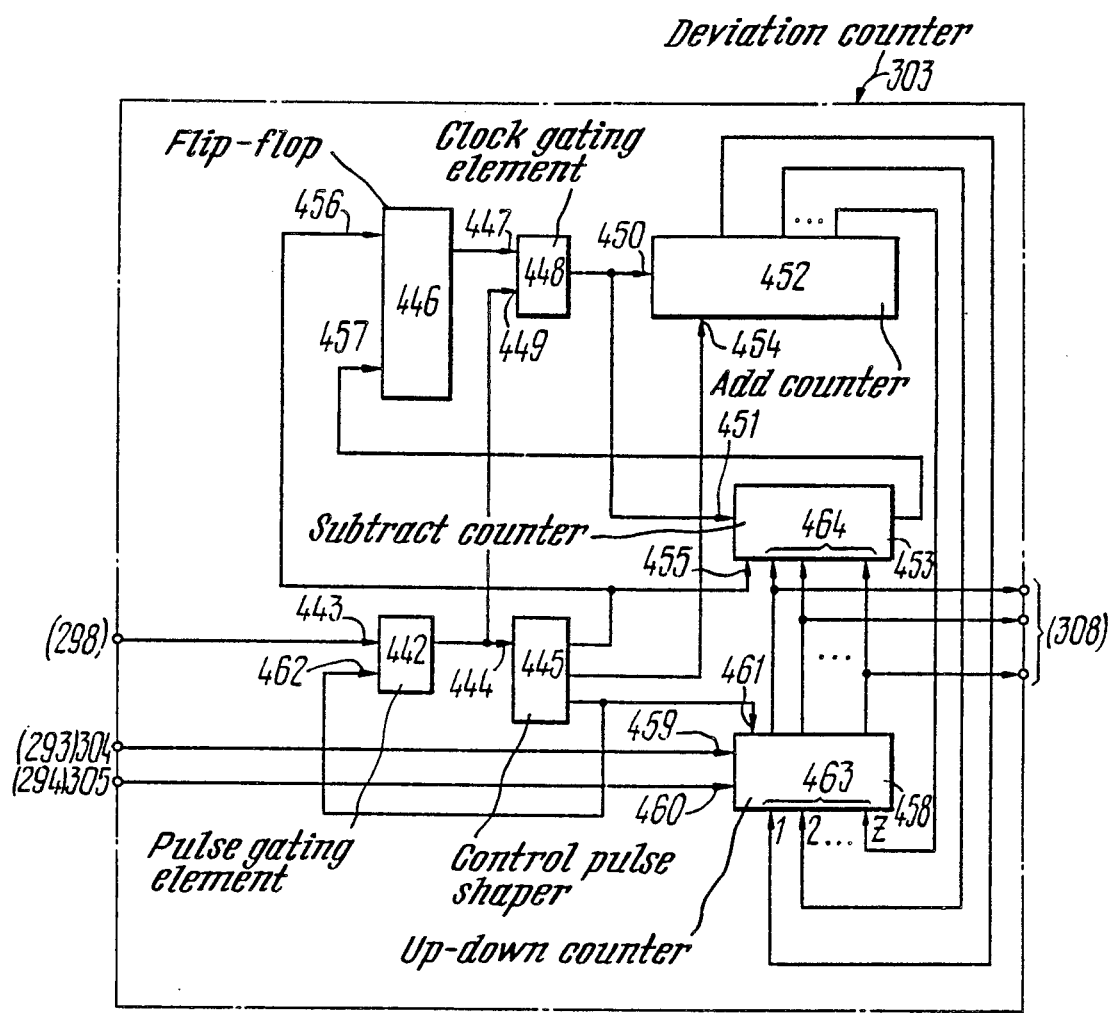
FIG. 21 shows a counter storing variations of a monitored parameter from a predetermined value.

The counter 303 storing variations of a monitored parameter from a preset value is designed as shown in FIG. 21. Referring to the drawing said counter comprises an element 442 for gating pulses produced by the pulse generator 298, an input 443 of said element being connected to the output of the pulse generator 298, while its output is connected to an input 444 of a means 445 for shaping pulses controlling operation of the counter 303. The counter 303 further comprises a flip-flop 446 whose output is connected to an input 447 of an element 448 for gating clock pulses. An input 449 of the gating pulse gating element 448 is connected to the output of the element 442, while its output is connected to complementing inputs 450 and 451 of an adding counter 452 and a subtracting counter 453, respectively. A reset input 454 of the adding counter 452 is connected to a second output of the shaper 445. A control input 455 of the counter 453 is combined with a set input 456 of the flip-flop 446 and connected to a first output of the control pulse shaper 445. The carry output of the subtracting counter 453 is connected to a reset input 457 of the flip-flop 446. The counter 303 also includes a reversible counter 458 whose add input 459 and subtract input 460 are connected to the outputs of the flip-flops 293 and 294, respectively, through the inputs 304 and 305 of the counter 303. A control input 461 of the reversible counter 458 is combined with an inverting input 462 of the pulse gating element 442 and connected to a third output of the control pulse shaper 445. Data inputs 463(1), . . . , 463(z) of the reversible counter 458 are connected bit-by-bit to the more significant digits at the outputs of the adding counter 452, while the outputs of the reversible counter 458 are connected bit-by-bit to data inputs 464 of the subtracting counter 453 and serve as the outputs of the counter 303, said outputs being also connected to the inputs of the code-to-voltage converter 308.

The shaper 445 may be a known dividing counter.

The gating elements 442 and 448 may be known AND gates.

The code-to-voltage converter 308 may be a known digital-to-analog converter. The amplifiers 309 and 310 may be known analog signal amplifiers.

The setting signal indication circuit 315 may be designed in a known manner, more specifically, on the basis of opto-electronic indication characters.

The switches 115 and 116 (FIG. 6) may be known two-position switches.

The switching units 121 and 126 may be known three-position switches.

Figure 22:
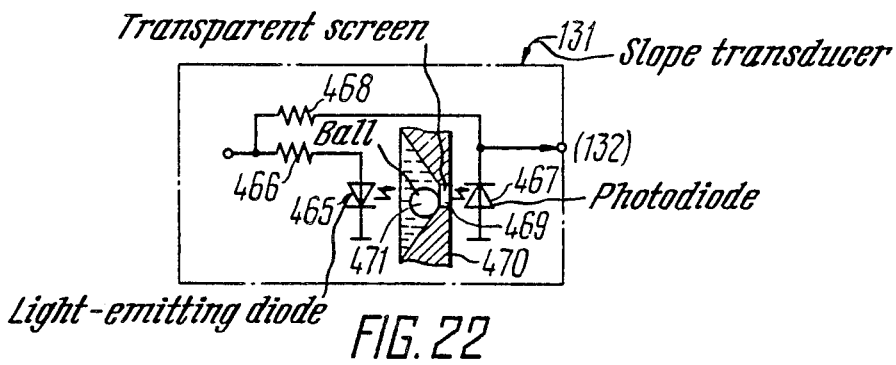
FIG. 22 shows a transducer for measuring slope between electrode axis and normal to surfaces of welded items.

The transducer 131 for measuring slope between electrode axis and normal to surfaces of welded items may be designed as shown in FIG. 22. Referring to the drawing the transducer 131 comprises a light-emitting diode 465, one lead of which is grounded and a second lead is connected to a power line through a resistor 466.

The transducer 131 further comprises a photodiode 467, one lead of which is grounded and a second lead is connected to the power line through a resistor 468. Said second lead serves as the output of the transducer 131 and is connected to the input of an inverter 132.

Moreover, the light-emitting diode 465 and the photodiode 467 are axially aligned so that light emitted by the diode 465 is incident directly on a sensitive element (not shown in the drawing) of the photodiode 467. On the luminous radiation axis there is a transparent screen 469 fixed in place in the lower plane of a conical depression in opaque material of a spacer 470 provided in the case of the transducer 131. The depression accommodates a ball 471 which is aligned with the luminous radiation axis when slope variations are within preset limits.

The switches 134 and 139 may be known two-position switches. The write signal setting element 142 may be a known breaking single-pole self-reset switch. The gating element 150 may be a known gate.

The arc-welding monitor (FIG. 1) operates in the following manner. Before welding operations, the units 42 (FIG. 1), 91 (FIG. 4), 114 (FIG. 5) and respective assemblies are set to initial positions. Required values of current (I), voltage (U) and per-unit length welding energy (Q) are set in the logic analyzer 30 by the switches 115, 116 and 117, respectively. Corresponding signals are applied to the setting signal inputs 21, 22 and 97 of the welding current, voltage and per-unit length energy comparators 17, 18 and 96, respectively. If required, welding current, voltage and per-unit length energy setting signals are furnished by the setting signal generating unit 114 and selected by the setting signal switching unit 121. The welding speed setting signal is generated by the circuit 46 and applied to the input 47 of the welding speed comparator 44.

Figure 9:
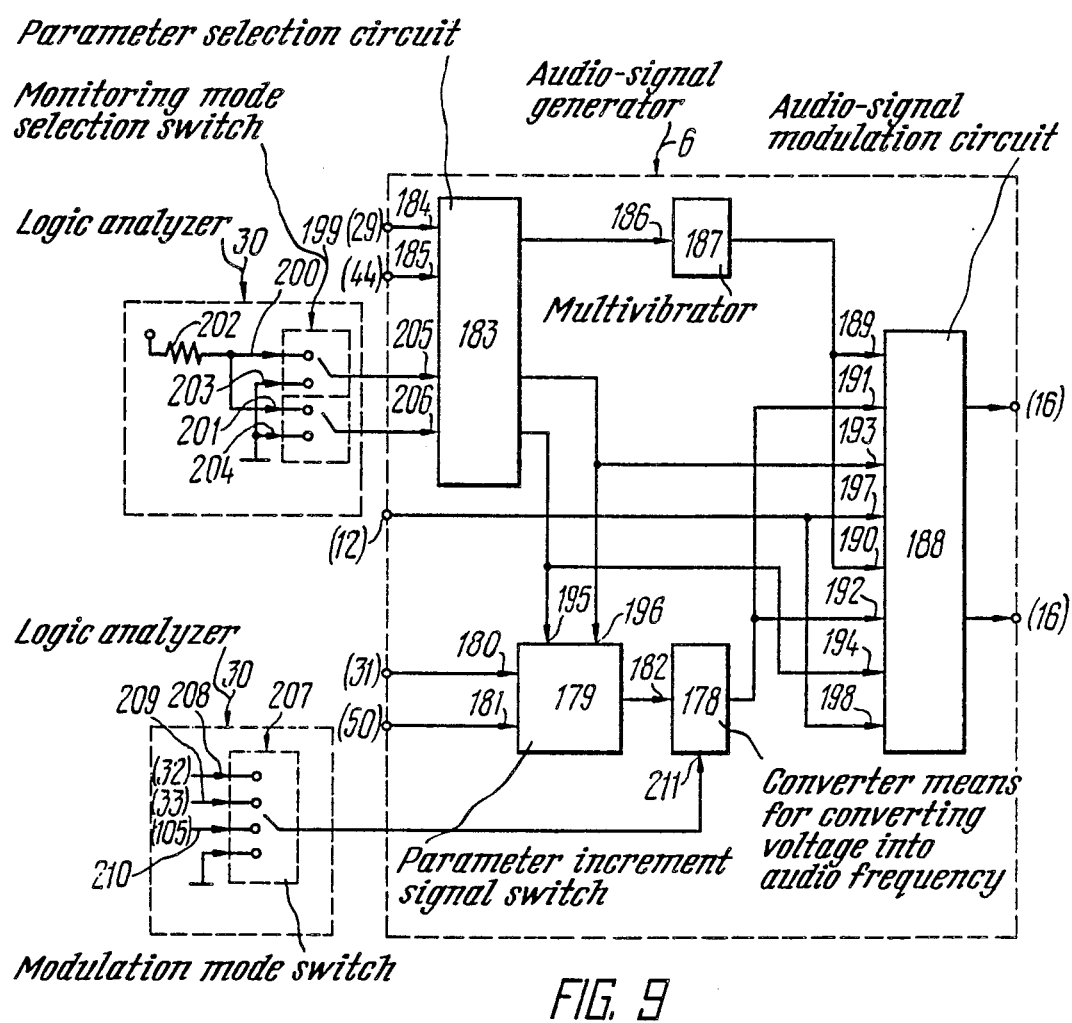
FIG. 9 shows an audio-signal generator according to the invention.
Figure 10:
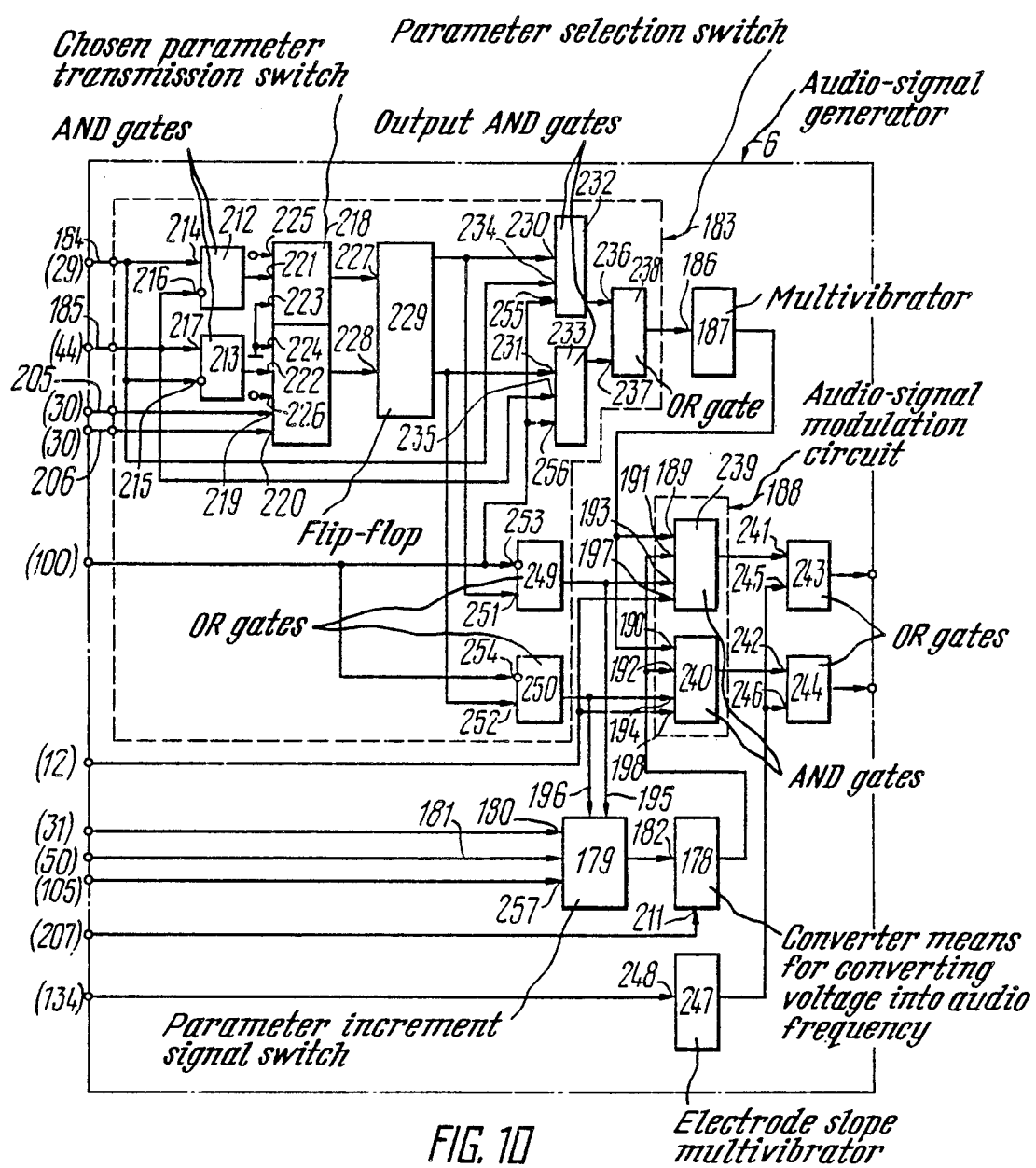
FIG. 10 shows the same generator furnishing electrode slope and per-unit length welding energy monitoring signals according to the invention.

When an arc is drawn at the beginning of the welding process, the threshold element 12 operates, thus furnishing a signal indicative of arcing as the output signal of the unit 8 exceeds the operating threshold of the element 12. Said signal indicative of arcing is fed to the input 14 of the audio-signal generator 6 enabling generation of feedback signals by the generator 6 for the playback means 16 (FIGS. 9, 10).

The unit 42 (FIGS. 1, 13) disposed along the monitored portion of a weld generates a first pulse and turns on the welding timer 146 (FIG. 8) as a welding arc passes the axis receiving radiation from the sensitive element (not shown in FIG. 13) of the first sensor 319 of said unit 42.

Figure 2:
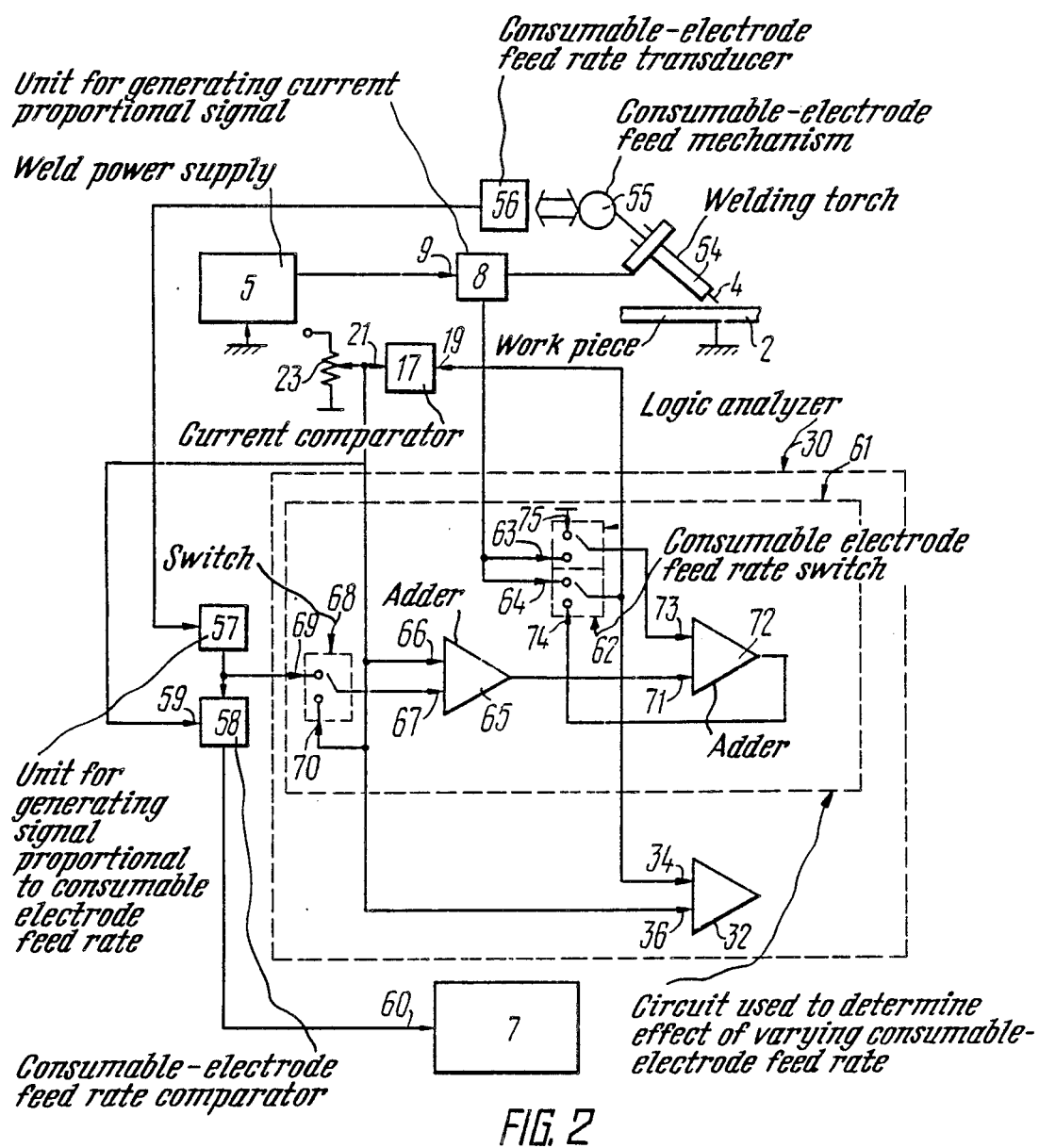
FIG. 2 shows the same monitor providing for consumable-electrode feed rate monitoring according to the invention.
Figure 3:
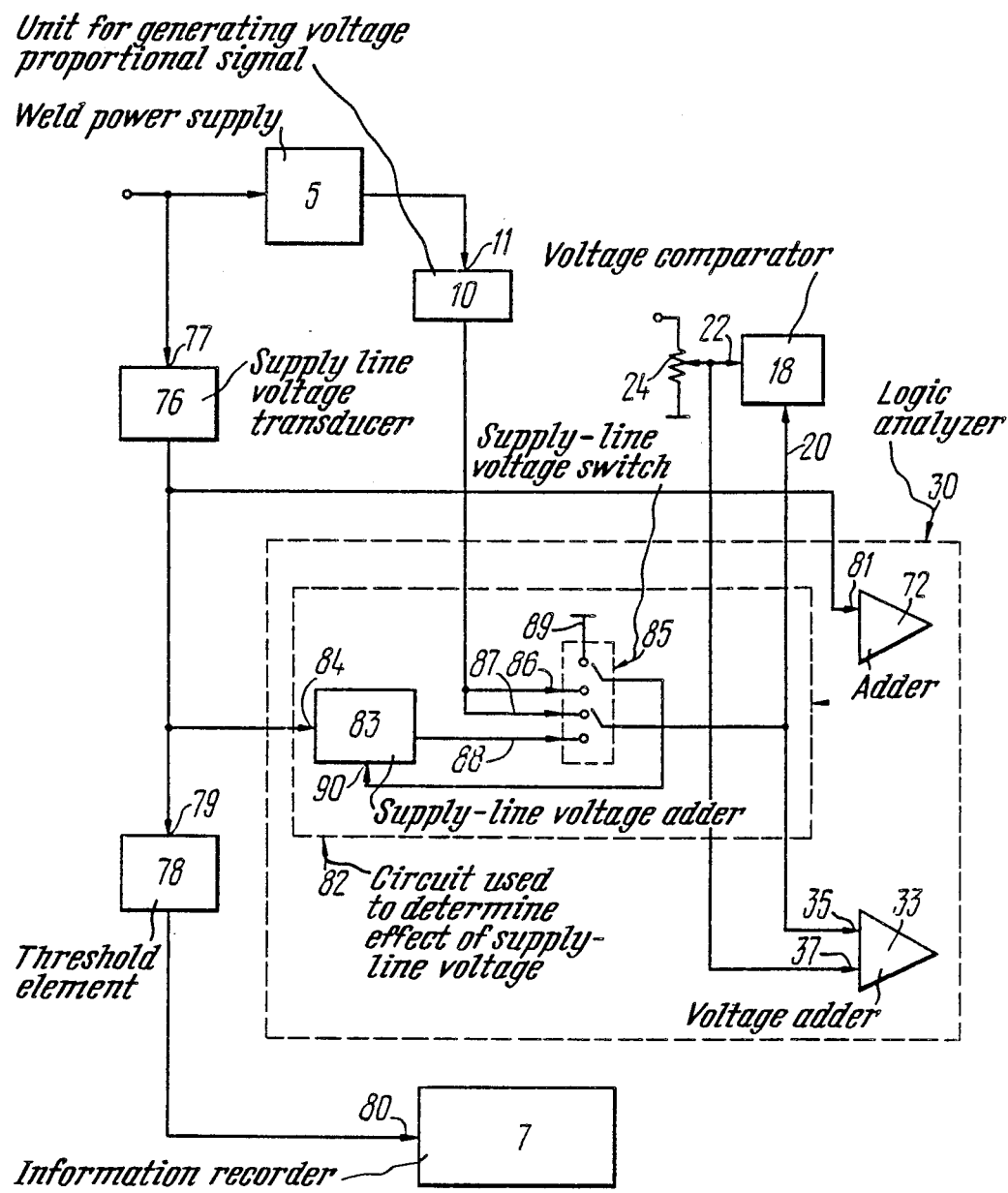
FIG. 3 shows the same monitor providing for supply-line voltage monitoring according to the invention.

As the welding process continues, the monitor receives, converts and generates signals proportional to the following welding parameters (FIGS. 1, 4 and 7): current (I); voltage (U); speed (V); per-unit length welding energy (Q); slope ($\theta$) between the electrode axis and normal to surfaces of welded items; consumable-electrode feed rate ($V_1$); and supply-line voltage variation ($U_1$). The monitor according to the invention also generates signals proportional to said welding parameters and invariant to changes in consumable-electrode feed rate $\Delta V_1$ and supply-line voltage $\Delta U_1$ (FIGS. 2,3).

The generated signals are proportional to changed welding current $i_o(t)$ affected by variations $\Delta V_1(t)$ and $\Delta U_1(t)$, to changed welding voltage $U_o(t)$ affected by variation $\Delta U_1(t)$, and to changed per-unit length welding energy $Q_o(t)$ affected by variations $\Delta V_1(t)$ and $\Delta U_1(t)$. Inasmuch as $\Delta V_1$ and $\Delta U_1$ affect the welding parameters linearly, the changed values will be expressed as follows:

$$i_o(t) = i(t) - [\pm \Delta i\{\Delta V_1(t)\} \pm \{\Delta V_1(t)\}] \quad (1)$$

$$U_o(t) = U(t) - [\pm \Delta V\{\Delta V_1(t)\}] \quad (2)$$

$$Q_o(t) = Q(t) - [\pm \Delta Q\{t, i(t), V_o(t)\}] \quad (3)$$

In the monitor according to the invention the corresponding comparators 17, 18, 96 and 44 compare the obtained values of the welding parameters [I(t), U(t), Q(t), $i_o(t)$, $U_o(t)$, $Q_o(t)$, $V_1(t)$] with those of setting signals obtained by engineering calculations or provided by the unit 114 (in the course of empirical selection of optimal production conditions by making check welds), which makes it possible to monitor numerical values of the welding parameters.

The signals indicative of variations of the welding parameters from preset values (the signals indicating presence and sign of such variations), which have been obtained in comparison, are fed by the use of the logic analyzer 30 to the audio-signal generator 6 which provides the playback means 16 with audio tones conveying information on numerical values of the welding parameters.

The information recorder 7 records variations of current (I), voltage (U), speed (V), per-unit welding energy (Q), slope ($\theta$), consumable-electrode feed rate ($V_1$), supply-line voltage ($U_1$); moments at which the radiation sensors 319 of the unit 42 are activated by radiation from the formed welding arc, pulses furnished by the radiation sensors 319 being used to provide the necessary indications; total time $t_{\Sigma i}$ at which changes in I, U, V, Q, θ are existent during the welding process, as well as welding time (t) and arcing time ($t_1$) corresponding to the duration of the arcing indication signal derived from the threshold element 12. The parameters $t$, $t_i$, $i_{\Sigma 1}$ are provided by the timer 146 and also by gating the signals from the timer 146 with a signal from the threshold element 12 and with output signals of the comparators 17,18,44,96 and the slope transducer 131 (FIG. 8).

Depending on monitored parameters, the corresponding switches of the logic analyzer 30 in the monitor are used to provide different monitoring conditions which may essentially comprise two stages. The preliminary stage involves generation by the unit 114 of a setting signal responsive to a particular welding parameter. The first monitoring stage includes:

(a) monitoring of the welding process at the preset value of each parameter;

(b) monitoring of the welding process at preset values of several parameters;

(c), (d) monitoring procedures under Items (a) and (b), respectively, with no account taken of changes in the monitored parameters due to variations $\Delta V_1$, $\Delta U_1$.

The second monitoring stage involves monitoring of the welding process, as indicated in Items (a) through (d) above, at a constant value of per-unit length welding energy.

Furthermore, the modulation mode switch 207 of the logic analyzer 30 is used to obtain required conditions for changing the parameters of an audio tone by the audio-signal generator 6 (modulation modes). The write signal switch 139 of the logic analyzer 30 is used to select the method of controlling the recording of the setting signal generated by the unit 114, more specifically, such control may be effected by the use of the slope transducer 131 or manually with the setting element 142 arranged on the handle of the electrode holder 3.

In different monitoring modes, depending on the design of the audio-signal generator 6, it produces at the outputs thereof an audio tone or a sound signal in the form of a worded instruction. When the generator 6 generates an audio tone, a change in the parameters (frequency and amplitude) of the audio tone in each channel of the playback means 16 depends on variations of numerical values of a specific welding parameter. In the playback means 16 a change in the audio-tone parameters is dependent on welding current or voltage in the first channel, on welding speed in the second channel, and on slope of the electrode axis in both channels.

When the welding current, voltage and speed are within preset limits, the playback means 16 provides in the corresponding channels equal tone frequencies conveying information on the values of said welding parameters. With the above welding parameters being beyond tolerable limits, sound vibrations carrying information on said parameters are discretely amplitude-modulated at the same frequency. Sound vibrations conveying information on slope are discretely amplitude-modulated at a higher carrier frequency.

In the second embodiment of the audio-signal generator 6 (FIG. 11) worded instructions are synthetized to correct a specific parameter, said instructions specifying the character of variation that caused the parameter to go beyond the permissible limits. More specifically, the synthesized worded instructions may be as follows: "Increase length" (of an arc or electrode proportional to welding voltage and current signals, respectively); "Decrease length"; "Increase speed", "Descrease speed", "Maintain slope".

In the two preferred embodiments of the audio-signal generator 6, with monitoring involving check for constancy of per-unit length welding energy, the generator 6 produces an audio signal only when said energy is not constant. This appreciably increases accuracy of monitoring quality of a weld since no feedback is formed for changing audio parameters in the channels of the playback means 16 in the event of welding voltage and current changes accompanied by simultaneous variations of welding speed (similar in sign and magnitude), which changes do not essentially interfere with constancy of per-unit length welding energy and the quality weld is increased.

Consider now operation of the units generating signals proportional to welding parameters.

The unit 8 (FIG. 15) for generating a signal proportional to welding current converts a welding current signal into a voltage signal by means of the resistance current transducer 349 built in the welding circuit. With the welding current present at the output of the transducer 349, the produced differential voltage $\Delta U$ is fed to the inputs of the differentiating amplifier 352 through a resistance network made up of resistors 350, 353 to 356. The differential amplifier 352 amplifiers the differential voltage $\Delta U$ to a preset level. The gain of the resistance network is chosen so that the input of the differential amplifier 352 receives voltages smaller than its supply voltage.

The proposed monitor operates satisfactorily over the entire range of variations of welding voltage equal to the voltage between the input 9 of the unit 8 and the ground terminal of the weld power supply 5. The output voltage of the differential amplifier 352 depends only on common-mode voltage variations caused by a change in the output voltage of the current transducer 349.

Connected to the output of the differential amplifier 352 is the low-pass filter 360 whose cut-off frequency is chosen to be lower than frequencies of expected interference affecting a useful welding current signal in arcing, for example, due to drop transfers, etc.

The unit 10 (FIG. 16) for generating a signal proportional to welding voltage converts by means of a voltage divider (variable resistor 361) said welding voltage (i.e., voltage between the input 11 of the unit 10 and the ground terminal of the power supply 5) so as to provide a required gain. The low-pass filter 363 connected to the resistor 361 is similar to the filter 360.

The unit 42 (FIG. 13) for generating a signal proportional to welding speed provides time intervals $\Delta t$ proportional to welding speed V. This is achieved by locating the radiation sensors 319 along a monitored weld at equal distances $\Delta l$ from one another and by providing indications of arc passage through the sensitivity zone of each transducer 131. Since the distance $\Delta l$ is constant, the time interval between signals furnished by the radiation sensors 319 conveys information on welding speed V, as is apparent from the equation $$\Delta t = \Delta l / V \tag{4}$$

Before the welding operations, a signal is applied to the set input 339 of the unit 42, while the flip-flop 330 and the counter 327 are cleared to zero. The stages of the counter 327 are, also set to zero. This enables the radiation signal switch 320 to select the first switching address and to switch the first input 321-1 and the output of the sensor 319-1 to its output. Since no arc is initiated, the sensor 319-1 does not receive radiation and its output signal is zero. Said signal is fed through the switch 320 to the input 323 of the gating element 322, thereby blocking the pulses of the generator 325 at the clock input 328 of the counter 327.

As an arc is initiated and drawn along the weld, the first sensor 319-1 receives its radiation and develops at its output a one signal which is applied through the output of the switch 320 closed on the input 321 to the input 323 of the gating element 322, thus unblocking the complementing input 328 of the counter 327. The counter 327 is enabled. After the counter 327 stores $2^{M-1}$ pulses (where M is the output stage of the counter 327 and $2^{M-1}$ is the chosen number of averaging clocks of the generator 325), its output develops a logic 1 signal which marks the start of time interval $\Delta t$. The logic 1 signal derived from the output of the counter 327 is simulatneously applied to the complementing input 333 of the radiation 334 and to the data input 329 of the flip-flop 330. The radiation 334 is transferred to the next state changing information at its outputs and, consequently, at the control inputs 335 of the switch 320 which, as a result, switches its output to the second input 321-1 receiving a logic 0 singal since the sensor 319-2 has not yet received radiation from the welding arc.

The logic 0 signal is fed through the output of the switch 320 to the input 323 of the gating element 322, thus blocking it repeatedly.

As said logic 1 signal is applied from the output of the counter 327 to the data input 329 of the flip-flop 330, it is carried by the pulse, which comes to the complementing input 331 of the flip-flop 330 from the generator 325, to the output of the flip-flop 330 setting the counter 327 to zero, which completes generation of the pulse of the first radiation sensor 319-1.

As the welding arc excites radiation sensor 319-2, its output develops a logic 1 signal which, in much the same manner as the logic 1 signal of the first radiation sensor 319-1, causes the unit 42 to produce at its output a second pulse of the second radiation sensor 319-2.

The unit 42 will subsequently function in a similar manner as the welding arc excites the other radiation sensors 319-3, . . . , 319-n. As the last pulse of the radiation sensor 319-n is generated by the unit 42, said unit, in addition to the above functions, blocks the input 336 of the gating element 322 with a logic 1 signal from the address shaper 334. Said signal is originated after the switch 320 selects the input 321-n (of the sensor 319-n), that is, after the address shaper 334 is set to the last state.

The gating element 322 is unblocked by removing the carry signal of the address shaper 334 on application of another signal to the set input 339.

The unit 57 for generating a signal proportional to a consumable-electrode feed rate converts the signal of the consumable-electrode feed rate sensor 56 into a voltage signal whose proportionality factor corresponds to the gating of the unit 8.

The welding current $I_o$ is linearly dependent on the consumable-electrode feed rate $V_1$, said dependence varying for different diameters of said electrode:

$$I = a + b \cdot V_1 \tag{5}$$

where a and b are constants dependent on the electrode diameter.

The above relationship is realized in the unit 57 which accepts at its input a signal proportional to the consumable-electrode feed rate. From said input the signal is fed to the output of the unit 57 whose gain is proportional to the constant b. The set input of the unit 57 receives a signal proportional to the constant a. The unit 57 develops at its output a signal proportional to welding current according to equation (5).

The supply-line voltage transducer 76 finishes a signal U(t) proportional to variations of supply-line voltage:

$$U(t) = K[U_1(t) - U_1^o] = \Delta U_1(t) \cdot K_{76} \tag{6}$$

where
$U_1(t)$ = present value of supply-line voltage;
$U_1^o$ = normalized value of supply-line voltage; and
$K_{76}$ = gain of transducer 76.

The unit 57 and the transducer 76 are used in the circuits 61 and 82 for obtaining changed values of current, voltage and per-unit length welding energy according to equations (1) through (3).

A changed value of welding current $i_o(t)$ dependent on speed variation $\Delta V_1$ (in mechanized arc welding, as shown in FIG. 2) and variation of supply-line voltage $\Delta U_1$ (in manual or mechanized arc welding, as shown in FIG. 3) is obtained by setting the switch 62 to a position at which its outputs are closed on the inputs 63, 74 and the switching output of the switch 68 is closed on the input 69. The adder 65 produces a signal indicative of a welding current variation due to changed speed $V_1$, that is, the signal $\Delta i \{\Delta V_1(t)\}$. This signal and the signal of the transducer 76 proportional to variation $\Delta U_1$ come to the inputs 73 and 81 of the adder 72 whose gain ensures proportionality of said signals with respect to the chosen current signal gain.

Considering linear dependence on variations attributable to wrong actions of the welding operator the welding current signal i(t) will be expressed as $$i(t) = i^o \pm \Delta i(c) \pm \Delta i(b) = i_o(t) \pm \Delta i(b) \tag{7}$$

where
$i_o$ = preset welding current;
$\Delta i(c)$ = welding current variations due to wrong actions of the welding operator, primarily attributable to changed electrode length; and
$\Delta i(b)$ = welding variations due to changes $\Delta V_1$ and $\Delta U_1$.

Referring to equation (7) the monitor according to the invention provides at the output of the adder 72 a welding current signal $i_o(t)$ with variations introduced by the welding operator due to a changed electrode length. This permits monitoring both the welding current and the welder's actions, which is needed to check his proficiency.

Changes in welding voltage (2) depend on variations of supply-line voltage $\Delta U_1$ and on the arc length changed by the welder in manual arc welding. Similarly, the adder 83 develops at its output a welding voltage signal $U_o(t)$ accounting the variations introduced by the welding operator due to a changed arc length.

In the monitor according to the invention different conditions for generating a signal proportional to per-unit length welding energy permit utilization of different types of changed per-unit length welding energy. The switch 109 of the logic analyzer 30 is used to select a particular type of changed per-unit welding energy. The possibility of obtaining different types of changed per-unit welding energy in the proposed monitor increases accuracy of monitoring welder's operation.

The unit 91 (FIG. 20) for generating a signal proportional to per-unit length welding energy is used to multiply together signals proportional to welding current and voltage. Said signals are fed from the inputs 92 and 93 of the unit 91 to the inputs 432 and 433 of the multiplier element. The product-proportional voltage is stored by the integrator 435 since the time t at which a signal comes from the respective sensor 319 till the moment t+t when a corresponding signal from the next sensor 319 arrives whereupon the integrator 435 is cleared to zero to enable further storage of information during a new time interval $\Delta t$. The integrator 435 produces the voltage $$U_{435} = \int_0^{\Delta t} U\{U(t)\} \cdot U\{i(t)\} dt \qquad (8)$$

where $\Delta t = t_{i+1} - t_i$, i is any value from 1 to n, determined by the number of the sensor 319.

The voltage $U_{435}$ is stored by the storage and retrieval element 440 for the time $\Delta t$. The integrator 435 and the element 440 are controlled by signals from the radiation sensor 319 coming to the input 94 of the unit 91.

Said signals are applied to the control input 439 of the flip-flop 446 causing the voltage of the integrator 435 to be stored by the storage and retrieval element 440 and with a delay for $\tau_{437}$ introduced by the delay element 91 arrive at the reset input 436 of the integrator 435, thus clearing it to zero. Before the welding operations, the set inputs (not shown in the drawing) of the integrator 435 and the element 440 receive a set signal setting the integrator 435 and the element 440 to zero. The transducer 131 for measuring slope between electrode axis and normal to surfaces of welded items generates a logic 0 signal when solid slope exceeds a preset value and a logic 1 signal when solid slope is smaller than a preset value. The monitored slope limits are set by utilizing the spacers 470 with a specific depression opening angle resembling a truncated cone.

The transducer 131 (FIG. 22) operates in the following manner. In normal position (with slope being within tolerance), the ball is located at the bottom of the depression under the action of gravitational forces, thus blocking luminous radiation from the light-emitting diode 465 to the sensitive element (not shown in FIG. 22) of the photodiode 467. The photodiode is disabled and a logic 1 signal from its cathode is fed to the output of the transducer 131.

When the solid slope is beyond the predetermined limits, the ball 471 rolls out of the depression whereby luminous radiation from the light-emitting diode 465 is transmitted to the sensitive element of the photodiode 467. The resistance of the photodiode 467 is sharply decreased and a logic 0 signal developed at its cathode is fed to the output of the transducer 131.

Consider now, by way of example, operation of the welding current comparator 17 (FIG. 17) to illustrate the functioning of the welding current, voltage, per-unit length welding energy and consumable-electrode feed rate comparators 17,18,96 and 58, respectively. The input 19 of the comparator 17 receives a present signal proportional to welding current, while its input 21 accepts a setting signal proportional to the preset value of welding current I.

When the signal proportional to welding current exceeds the upper limit of its setting signal, that is, at $I(t) > I - \Delta I$, a logic 1 signal is generated at the output of the threshold element 368 and the output of the threshold element 368 develops a logic 0 signal.

When the signal proportional to welding current is below the lower limit of its setting signal, that is, at $I(t) < I - \Delta I$, a logic 0 signal is generated at the threshold element 364 and the output of the threshold element 368 develops a logic 1 signal.

The upper and lower limits of the setting signal are set by selecting appropriate values of circuit components of the threshold element 364 and 368.

The output signals of the threshold elements 364 and 368 are fed to the OR gate 372 whose output, that is, the first output of the welding current comparator 17 develops a logic 1 signal when present values of the signal proportional to welding current are beyond permissible limits or a logic 0 signal when present values of said signal proportional to welding current are within tolerable limits.

The second output of the welding current comparator 17 develops a logic 1 signal if the input signal is below the lower limit of the setting signal, and a logic 0 signal if said input signal is above the lower limit of the setting signal.

The comparators 18, 58 and 96 operate in much the same manner.

The welding speed comparator 44 (FIG. 18) compares the time interval $\Delta t$ proportional to average welding speed within the interval $\Delta l$ with the upper and lower limit values of the preset time interval $\Delta t°$ corresponding to a predetermined value of welding speed according to equation (4).

The comparator 44 operates in the following manner.

Before the welding process begins, the switch 414 of the logic analyzer 30 is used to obtain a required value of a digital welding speed setting signal (time interval code), said signal being applied through the inputs 47 of the comparator 44 to the inputs 385 of the decoder 384. The counters 389 and 390 are cleared to zero and the flip-flops 399, 400 are set to one over the initial setting circuits of the comparator 44 (not shown in the drawing).

As a welding arc excites the first sensor 319-1, the unit 42 produces the signal of the sensor 319-1 coming from the present welding speed input 45 of the comparator 44 to the pulse shaper 373. A pulse with a predetermined duration $\tau$ is obtained at the output of the shaper 373 as soon as the signal of the sensor 319-1 arrives.

Said pulse affects the input 386 of the decoder 384 and sets at its outputs the code of the lower limit of the preset time interval $\Delta t°$, which is entered in the counter 389 as said pulse arrives at the input 395.

Also, said pulse passes through the delay element 376 and, after a time delay $\tau_{376} \geq \tau$, causes the output code of the decoder 384 to be written in the counter 390. The code of the decoder 384 will correspond to the upper limit of the preset time interval $\Delta t°$ since it is generated after the pulse at the input 386 ceases.

During the time $(\tau_{376}+\tau)$ at which the codes of the decoder 384 are recorded, a logic 1 signal at the output of the OR gate 379 prevents passage of pulses through the AND gate 381 to the clock inputs 391 and 392 of the counters 389 and 390, respectively, resulting in that information may not be read from the counters 389, 390 even if a logic 1 is present at the control inputs 393, 394 of the counters 389, 390 and absent at the inputs 395, 396 of the counters 389, 390, respectively, during time intervals $\tau$ and $\tau_{376}$. When a logic 0 is set at the output of the OR gate 379 (after the time interval $\tau+\tau_{376}$), the AND gate 381 is enabled and presence of a logic 0 at the control inputs 393 and 394 indicative of the subtraction mode of the counters 389 and 390 makes it possible to read the contents of the counters 389 and 390 at the inputs 391 and 393 with pulses from the generator 383.

The pulse of the sensor 319-1 is also applied to the clock inputs 412 and 413 of the flip-flops 408 and 409. Since the flip-flops 399 and 400 are found in the initial state, logic 0 signals will be written into the flip-flops 408 and 409 by way of the data inputs 410 and 411. Said signals transmit to the output of the comparator welding speed 44 information on compliance of the present value of the time interval $\Delta t$ with the preset time interval $\Delta t°$, which indicates that there are no welding speed errors.

The signal of the sensor 319-1 delayed for $\tau_{403}$ by the delay element 403 is applied to the reset input 401 and to the set input 402 of the flip-flops 399 and 400, respectively, thus resetting and setting the flip-flops 399 and 400 and preparing them for reception at the set input 397 and the reset input 398 of carry pulses from the counters 389 and 390, said pulses being used to mark the end of time intervals equal to the lower and upper limits of the preset time interval $\Delta t°$.

Compliance of the present value of the time interval $\Delta t$ with tolerance is recorded by a signal from the subsequent sensor 319, for example, the sensor 319-2 which enters in the flip-flops 408 and 409 the states, in which the flip-flops 399 and 400 have been at the instant when the second signal of the sensor 319 arrived. The state of the flip-flops 399 and 400 reflects the relation between the present value of the obtained time interval $\Delta t$ and the preset time interval $\Delta t°$ as follows:

$$U_{399} = \begin{cases} 1 \text{ at } \Delta t < t° \\ 0 \text{ at } \Delta t \in t° \\ 0 \text{ at } \Delta t > t° \end{cases} \quad (9)$$

$$U_{400} = \begin{cases} 0 \text{ at } \Delta t < t° \\ 0 \text{ at } \Delta t \in t° \\ 1 \text{ at } \Delta t > t° \end{cases} \quad (10)$$

The following signals $U_{44\text{-}1}$ and $U_{44\text{-}2}$ will be obtained at the first and second outputs of the welding speed comparator 44 connected, respectively, to the inputs 48 of the audio-signal generator 6 and to the input 272 of the switch 267 of the same generator 6:

$$U_{44\text{-}1} = \begin{cases} 1 \text{ at } \Delta t < t° \ (V > V°) \\ 0 \text{ at } \Delta t \Delta t° \ (V \in V°) \\ 1 \text{ at } \Delta t > t° \ (V > V°) \end{cases} \quad (11)$$

$$U_{44\text{-}2} = \begin{cases} 1 \text{ at } \Delta t < t° \ (V > V°) \\ 0 \text{ at } \Delta t \in t° \ (V \in V°) \\ 0 \text{ at } \Delta t > t° \ (V < V°) \end{cases} \quad (12)$$

In addition to information recording in the flip-flops 408 and 409, the pulse of the sensor 319-2, similarly to the pulse of the sensor 319-1, presets the counters 389, 390 and reads information therefrom so that the present time interval may be subsequently compared with the preset time interval.

Information on compliance of measured values of welding speed with a preset value within each interval $\Delta l$ is stored in the flip-flops 389 and 390 throughout the subsequent interval.

The monitoring sequence logic analyzer 30 selects a monitoring mode to suit the previously described monitoring stages.

A required monitoring mode is selected by setting the switches of the logic analyzer 30 to appropriate states. The Table below lists the switches of the logic analyzer 30 and gives their functions and states in which they must be found to ensure desired monitoring conditions.

TABLE

| No. 1 | Switch reference numeral 2 | Function 3 | State Switch output connected to its input 4 | Monitoring mode 5 |
|---|---|---|---|---|
| 1 | 62 | Application of signal proportional to i(t) to input 73 of adder 72 | 62.1–75<br>62.2–64 | Monitoring of i(t) |
| 2 | 62 | Application of signal proportional to i(t) or i$_o$(t) to input 19 of of welding current comparator 17 | 62.1–63<br>62.2–74 | Monitoring of i$_o$(t) |
| 3 | 109 | Application of signal proportional to i(t) or i$_o$(t) to input 92 of unit 91 or i$_o$(t) | 109.1–112 | Monitoring of Q(t) furnished in response to signal i(t) |
| 4 | 109 | Same | 109.1–110 in response to signal i(t) | Monitoring of Q(t) furnished |
| 5 | 115 | Application of welding current setting signal (I°) to input 21 of comparator 17 | 115–118 | Setting of I° by welding in current setting resistor (23) |
| 6 | 115 | Same | 115–122 | Setting of I° produced by unit 114 |
| 7 | 68 | Connection of output of unit 57 to input 67 of adder 65 | 68–69 | Monitoring of i$_o$($\Delta V_1$) |
| 8 | 68 | Same | 68–70 | Monitoring of i(t) |
| 9 | 85 | Application of signal proportional to U(t) | 85.1–89 | Monitoring of U(t) |

TABLE-continued

| No. 1 | Switch reference numeral 2 | Function 3 | State Switch output connected to its input 4 | Monitoring mode 5 |
|---|---|---|---|---|
| | | to input 90 of adder 83 | 85.2-87 | |
| 10 | 85 | Application of signal proportional to U (t) or $U_o(t)$ input 20 of comparator 18 | 85.1-86<br>85.2-88 | Monitoring of $U_o(t)$ |
| 11 | 109 | Application of signal proportional to U(t) or $U_o(t)$ to input 93 of unit 91 | 109.2-113 | Monitoring of Q(t) obtained in response to signal U(t) or $U_o(t)$ |
| 12 | 109 | Same | 109.2-111 | Monitoring of Q(t) obtained in response to signal U(t) |
| 13 | 116 | Application of welding voltage setting signal $U^o$ to input 20 of comparator 18 | 116-119 | Setting of $U^o$ welding voltage setter |
| 14 | 116 | Same | 116-123 | Setting of $U^o$ by unit 10 |
| 15 | 31 | Application of signal proportional to $\Delta I$ or $\Delta U$ to input 41 of generator 6 | 31-38 | Monitoring involving modulation, $\Delta I$ |
| 16 | 31 | Same | 31-39 | Monitoring involving modulation, $\Delta U$ |
| 17 | 29 | Connection of output of comparator 17 or 18 to input 40 of generator 6 (information on presence of variation) | 29-28 | Welding current monitoring |
| 18 | 29 | Same | 29-27 | Welding Voltage monitoring |
| 19 | 274 | Connection of input of comparator 17 or 18 to input 273 of switch 267 of generator 6 (information on change sign) | 274-275 | Welding current monitoring |
| 20 | 274 | Same | 274-276 | Welding voltage monitoring |
| 21 | 100 | Connection of output of per-unit length welding energy comparator 96 to input 104 of generator 6 | 100-101 | Monitoring involving check of condition (14) |
| 22 | 100 | Same | 100-102 | Monitoring w/o check of condition (14) |
| 23 | 117 | Application of signal proportional to per-unit welding energy setting singal ($Q^o$) to input 97 of comparator 96 | 117-120 | Setting of $Q^o$ by per unit energy setter |
| 24 | 117 | Same | 117-124 | Setting of $Q^o$ furnished by unit 114 |
| 25 | 121 | Connection of output of unit 114 to inputs 123, 124 of switches 115, 116, 117 | 121-121.1 | $I^o$ shaped |
| 26 | 121 | Same | 121-121.2 | $U^o$ shaped |
| 27 | 121 | Same | 121-121.3 | $Q^o$ shaped |
| 28 | 126 | Application of signals proportional to i(t), U(t), Q(t) to input 130 of unit 114 | 126-127 | Generation of I |
| 29 | 126 | Same | 126-128 | Generation of U |
| 30 | 126 | Same | 126-129 | Generation of Q |
| 31 | 207 | Application of signals proportional of $\Delta i(t)$, $\Delta U(t)$, $\Delta Q(t)$ to input 211 of converter 178 of generator 6 | 207-208 | Monitoring involving frequency modulation, $\Delta i(t)$ |
| 32 | 207 | Same | 207-209 | Monitoring involving frequency modulation, U(t) |
| 33 | 207 | Same | 207-210 | Monitoring involving frequency modulation, Q(t) |
| 34 | 207 | Application of signals proportional to $\Delta i(t)$, $\Delta U(t)$, $\Delta Q(t)$ to input 211 of converter 178 of generator 6 | 207-"0" | Monitoring w/o frequency modulation |
| 35 | 134 | Application of signal from transducer 131 to input 136 of generator 6 | 134-135 | Monitoring with change in $\theta$ taken into account |
| 36 | 134 | Same | 134-138 | Monitoring with change in $\theta$ being disregarded |
| 37 | 142 | Application of control signal to input 144 of unit 114 | 142-145 | Generation of setting signal |
| 38 | 142 | Same | 142 open | Recording of obtained setting signal |
| 39 | 139 | Application of control signal from transducer 131 or element 142 to input 144 of unit 114 | 139-141 | Control of recording of setting signal from element 142 |
| 40 | 139 | Same | 139-140 | Control of preset value of setting signal from transducer 131 |
| 41 | 168 | Connection of output of comparator 17 to input 173 of unit 7 through AND gate 153 | Closed | Recording of total time at which changes in parameter I are existent |
| 42 | 169 | Cennection to output of comparator 18 to input 174 of unit 7 through AND gate 154 | Closed | Recording of total time at which changes in parameter U are existent |
| 43 | 170 | Connection of output of comparator 44 to input 175 of unit 7 through AND gate 154 | Closed | Recording of total time at which changes in parameter V are existent |
| 44 | 171 | Connection of output of comparator 96 to input 176 of unit 7 through AND gate 156 | Closed | Recording of total time at which changes in parameter Q are existent |
| 45 | 172 | Connection of output of transducer 131 to input 177 of unit 7 through AND gate 157 | Closed | Recording of total time at which changes in parameter V are existent |
| 46 | 199 | Generation of control signals of switch 218 at inputs 205 and 206 of circuit 183 of generator 6 | 199.1-203<br>199.2-204 | Monitoring of welding current or voltage |
| 47 | 199 | Generation of control signals of switch 218 at inputs 205 and 206 of circuit 183 of generator 6 | 199.1-203<br>199.2-201 | Monitoring of welding current or voltage and welding speed |
| 48 | 199 | Same | 199.1-200<br>199.2-204 | Welding speed monitoring |
| 49 | 414 | Generation of signals setting welding speed $V^o$ to be fed to input 47 of comparator 44 and to input 52 of circuit 50 | 414(1), . . . ,<br>414(k−1)-(414) | Generation of digital setting signal $V^o$ |
| 50 | 414 | Same | 414(k)-(50) | Generation of analog setting signal $V^o$ |

The audio-signal generator 6 performs the following functions:

generation in each channel of the playback means 16 of an audio tone with variable parameters dependent for each channel on variations of numerical values of a specific welding parameter;

generation of audio tones in monitoring modes involving check on constancy of per-unit length welding energy only when said energy is not constant;

generation of an audio tone with frequency modulation parameters dependent upon variations of a specific welding parameter.

Consider now operation of the audio-signal generator 6 in generating an audio tone in a given channel of the playback means 16. When an audio tone is generated in monitoring the welding process at a preset value of one parameter (welding current or voltage or welding speed), the generator 6 controlled by the logic analyzer 30 selects the required channel of the playback means 16 and generates therein an audio tone with different parameters (FIG. 9).

This is done by setting or resetting the flip-flop 229 by connecting its inputs 227 and 228 to the logic 1 and logic 0 lines. So, in monitoring only welding current or voltage, the logic 0 signal generated at the output of the flip-flop 229 after it is set to the one state disables the AND gate 233. The multivibrator 187 may, thus, be triggered only in response to an error signal from the input 40 of the generator 6, which passes through the AND gate 232 when it is not disabled. The output signals of the flip-flop 229 coming to the switch 179 cause the converter 178 to receive a welding current or voltage variation signal from the input 41 of the generator 6, that is, a signal indicative of a change in the welding parameter in response to which the generator 6 receives at its input 40 error signals to trigger the multivibrator 187. Variations of welding voltage and current from preset values are handled by the adder 32 and 33 comprised in the logic analyzer 30.

Welding speed variations are handled by the circuit 50 (FIG. 19) which operates in the signal subtraction following manner. Upon receipt of a pulse from any sensor 319 at the input 51 of the circuit 50, the signal fed from the integrator 419 is stored by the circuit at the input 425 of the storage and retrieval element 426. Said signal is proportional to the time interval $\Delta t$ between instants at which a welding arc passes two adjacent sensors 319. The signal of the sensor 319 delayed for $\tau_{423}$ is fed to the input 422 of the integrator 419 setting it to zero and activating it repeatedly for generating a signal proportional to the time interval $\Delta t$ between instants at which said welding arc passes other adjacent sensors 319. The output signal of the element 426 is applied to the adder 429 which develops at its output a signal indicative of a change in the present value of a welding speed signal with respect to a preset value, said output signal being produced during the time interval $\Delta t$ between instants at which said welding arc passes two adjacent sensors 319. Said signal is applied to the second input 430 of the adder 429. The integrator 419 is set to zero before the start of the welding operations.

The output signals of the flip-flop 229 coming to the AND gates 239 and 240 disable one of them in a manner similar to that described above for the AND gates 232 and 233, more specifically, the AND gate 239 under given monitoring conditions. As a result, the output of the audio-signal generator 6 coupled to the AND gate 239 is selected for generating an audio tone under given conditions. Stated differently, selection is made of a respective channel of the playback means 16 responsive to errors in welding current or voltage. Furthermore, both AND gates 239 and 240 may be disabled with an arcing indication signal coming to the input 14 of the generator 6 and turning into a logic 0 to disable the AND gates 239 and 240 when current values do not provide for arcing.

In addition to the signals disabling the AND gates 239 and 240, their inputs 189, 190 and 191, 192 receive signals from the outputs of the multivibrator 187 and the converter 178, respectively, said signals being used to generate an audio tone. The tone parameters (frequency and amplitude) are dependent on the numerical values of a monitored welding parameter. In the presence of error signals, for example, at the inputs 40, that is, with present values of welding current or voltage being below or above the specified numerical limits, the multivibrator 187 is triggered feeding a square pulse to the inputs of the AND gates 239 and 240 to apply discrete amplitude modulation to a beat tone of the signal fed to the AND gates 239 and 240 from the output of the converter 178. The parameters of the signal produced by the converter 178 (FIGS. 1, 4) are also dependent on the numerical values of monitored welding parameters.

The converter 178 may operate in two signal generation modes. In the first mode the signal frequency is proportional to the magnitude of a monitored parameter variation from a preset value, said signal being generated by the logic analyzer 30 and fed, more specifically, in welding current or voltage monitoring to the input 41 of the audio-signal generator 6. To enable operation in the first mode, the switch 207 of the logic analyzer 30 connects the input 211 of the converter 178 to a ground bus. This sets zero gain of the amplifier 342 and, consequently, creates conditions under which the output signal of the adder 345 is proportional to a signal indicative of a variation of a monitored parameter, the latter signal being present at the input 346 of the adder 345. The voltage-to-frequency converter 348 will, thus, produce a signal proportional to the above variation.

In the second signal generation mode of the converter 178, the audio-signal generator 6 generates an audio tone having frequency modulation parameters dependent on the magnitude of a change in a specific welding parameter and the modulation mode switch 207 of the logic analyzer 30 is set to a required position, thereby applying to the input 21 of the converter 178 a signal indicative of a change in one of the welding parameters (current, voltage or per-unit length welding energy). Said variation signal is simultaneously applied to the voltage-to-frequency converter 339 and to the amplifier 342. It causes generation of a signal having a constant amplitude and frequency and proportional to its level at the output of the voltage-to-frequency converter 339. Said variation signal also sets the gain of the amplifier 342 in proportion of the modulus (absolute value) of its level, due to which the amplitude and frequency of the output signal of said amplifier are proportional to the level of the signal indicative of variations of the chosen welding parameter. The signal of the amplifier 342 is added by the adder 345 to the signal indicative of variations of the monitored parameter, which comes from the output of the switch 179. The signal of the adder 345 causes generation of a compound signal at the output of the converter 348, first frequencies thereof being changed continuously in proportion to a changing level of variations of the monitored parameter, while second frequencies of said compound signal varied in an abrupt manner at a different speed are changed in proportion to a changing level of variations of the additionally chosen welding parameter.

To enable utilization of the second operating mode of the converter 178 in different monitoring conditions, that is, with frequency modulation involving the magnitude of the chosen welding parameter, it is necessary to set the respective switches of the logic analyzer 30 to required positions for generating signals indicative of variation of a specific welding parameter. Moreover, the operation of the converter 178 is characterized by that the frequency of an audio tone generated by said converter is independent of welding parameter values and remains constant when quality welds are made in all welding conditions, that is, at different preset numerical values of the welding parameters. The frequency of the converter 178 depends solely on changes in monitored parameters. This increases accuracy of monitoring the welding process and appreciably reduces adaptation time so that the welding operator may more readily recognize an optimal current frequency indicative of a quality weld.

In accordance with the invention there is provided one more welding monitoring mode at a preset value of one parameter, that is, electrode slope (FIG. 10). In this mode used jointly with one of the afore-mentioned welding monitoring modes at a preset value of welding current, voltage or speed, electrode slope variations beyond the preset limits result in a condition when the audio tone generated at the outputs of the AND gates 239 and 240 is combined in the OR gates 243 and 244 with an increased frequency signal produced by the electrode slope multivibrator 247 in response to an error signal fed from the sensor 131 through the logic analyzer 30 to the input 136 of the audio-signal generator 6. The circuit for generating a signal indicative of a slope variation operates similarly in all monitoring modes.

Consider now welding monitoring at preset values of several parameters, that is, at preset values of welding current, voltage and speed. In this mode, the switch 218 connects the outputs of the AND gates 212 and 213 to the inputs 227 and 228 of the flip-flop 229, respectively. The flip-flop 229 is randomly set to one of its stable states depending on the time at which one of the two error signals is produced, said error signals being fed to the generator inputs 40 or 48. The flip-flop remains in said stable state until the cause of the given error is eliminated. The other functions of the generator 6 are essentially similar to those described above.

In the afore-mentioned monitoring modes, no account has been taken of the interrelation between several welding parameters. In the monitor according to the invention, relations between welding current, voltage and speed are accounted for by generating a signal proportional to per-unit length welding energy, as shown in the equation $$Q(t) = kUI/V \qquad (13)$$

where k is a proportionality factor.

Keeping the magnitude Q(t) within preset limits ensures desired quality of a weld. In the proposed monitor, the above condition may be attained by checking constancy of per-unit length welding energy:

$$Q(t) \epsilon Q^o \pm \Delta Q \qquad (14)$$

where
$Q^o$ = preset value of per-unit length welding energy;
$\Delta Q$ = permissible variation limits of per-unit length welding energy;
$\epsilon$ = equivalence symbol.

In monitoring modes involving check of constancy of per-unit length welding energy, a logic 0 signal is present at the input 104 of the generator 6 when no errors occur in per-unit length welding energy. Said logic 0 signal disables the AND gates 232, 233, thus making the multivibrator inoperative; enables the AND gates 239, 240; and causes the switch 179 to apply a signal indicative of a change in per-unit length welding energy from the input 108 of the generator 6 to the converter 178. Said converter generates an audio tone, which is fed through the operative AND gates 239, 240 and the OR gates 243, 244 to both channels of the playback means 16.

When there is an error in per-unit length welding energy, a logic 1 signal from the input 104 of the audio-signal 6 enables the AND gates 232, 233, 239, 240 and the OR gates 249, 250, which provides for operation of the generator 6 in conditions previously described for monitoring modes with no account taken of constancy of per-unit length welding energy.

In the monitor forming the subject of the present invention, generation of the signal Q(t) and the checking of condition (14) make it possible to exclude generation of audio tones indicative of welding current, voltage and speed, which do not interfere with the process of making a quality weld. Thus, the welding operator will not get any erroneous information on the welding operation and on the need to change certain welding parameters.

Furthermore, welder's proficiency may be checked more accurately due to the fact that the values of Q(t) are obtained with due regard for varying values of welding current and voltage. If the welder maintains per-unit length welding energy within predetermined limits, set considering welding current and voltage values changed with no account taken of $\Delta V_1$ and $\Delta U_1$, and there are no errors in changed welding current and voltage, then errors in such welding parameters as current, voltage and per-unit length welding energy are not indicative of operator's errors in manual or mechanized arc welding but testify to disturbances affecting the welding process. In the same monitoring mode there may be errors in changed welding current and voltage opposite in sign to $\Delta V_1$ and $\Delta U_1$, which indicates that the welding operator is compensating for the variations in $\Delta V_1$ and $\Delta U_1$. When the operator's actions are correct, the monitor will not record the occurrence of errors in per-unit length welding energy set on the basis of unchanged welding current and voltage, which shows that the operator is proficient in welding operations.

The audio-signal generator 6 shown in FIG. 11 may be used for providing the operator with audio feedback signals in the form of worded instructions. Desired monitoring conditions are created by setting the switches of the logic analyzer 30 to required positions. The appearance at the inputs 46, 48, 104 and 136 of the generator 6 of error signals indicative of respective welding parameters (logic 1 signals) derived from the comparators 17, 18, 44, 96 and from the transducer 131 shows that there are errors in a respective parameter. The presence of logic 1 and logic 0 signals at the inputs 272 and 273 of the switch 267 of the generator 6 indicates that a variation of the monitored parameter is, respectively, below or above the preset limits.

A combination of error signals indicative of welding parameters is transmitted to the switch 267 forming at its outputs the address of the chosen area of the storage 280 corresponding to said combination of error signals indicative of welding parameters and causes generation of a logic 1 signal at the control output of the switch 267, said signal being fed to the complementing input 278 to trigger the address counter 277. Said counter reads the contents of the chosen locations of the storage 280. The code combinations read are applied from the outputs of the storage 280 to the code-to-voltage converter 283 which develops at its output an analog signal limited in the high- and low-frequency region by the audio-signal filter 285 and fed through the AND gate 287 to the playback means 16. Continuous generation of such signals (corresponding to the number of code combinations read) permits obtaining a synthesized worded instruction. Such an instruction is blocked by the AND gate 287 when a logic 0 signal indicative of an extinguished arc is present at the input 14 of the audio-signal generator 6.

Completion of counting is indicated by a logic 1 signal generated at the complementing output of the counter 277 after forming the last address code. Said signal is applied to the control input 279 of the switch 267 resetting its inputs, that is, transferring it to the initial state. If the error has not been corrected and logic 1 signals are present at the respective inputs of the generator 6, said worded instruction is synthesized repeatedly. If no errors are present, the switch 267 is reset and there are no sound vibrations in the playback means 16. If other errors occur, another code is generated at the output of the switch 267 and another worded instruction is synthesized.

Specific worded instructions are provided for each type of error in monitored parameters. In the event of changes in welding voltage or current, which is primarily attributable to changes in the arc length in manual arc welding or in the electrode length in mechanized arc welding, the following words may, for example, be synthesized: "Increase length" (when the arc length or the electrode length is below the prescribed limits), "Decrease length" (when the arc length or the electrode length is above the prescribed limits).

The following words may, for example, be synthesized in the event of changes in welding speed: "Increase speed" or "Decrease speed". The "Maintain slope" instruction may be synthesized when the electrode slope is changed.

In the proposed monitor a setting signal or a respective welding parameter (I, U or Q) may be generated by the use of the respective resistor 23, 24 or 98 or by the unit 114 for generating a setting signal. Operation of said unit will be considered below.

The unit 114 (FIGS. 7, 12) automatically generates a setting signal characterizing a monitored parameter, which corresponds to an optimal welding process, and stores its value for the required time period. When the setting signal is generated automatically, a zero signal is present at the input 144 of the unit 114, said signal being provided by the element 142 or the transducer 131 (FIG. 7). Upon receipt of said signal, the code-to-voltage converter 308 continuously receives information from the counter 303 converting it into voltage proportional to the obtained setting signal of a monitored parameter and feeding it to the amplifiers 309 and 310.

The actual value of a monitored parameter, for example, welding current is converted by a respective unit, for example, the unit 8 into an electrical signal applied to the input 290 of the comparator 289. The inputs 313 and 314 of the comparator 289 receive signals from the amplifiers 309 and 310, respectively, said signals being equal to the upper and lower values of the setting signal of a monitored parameter.

If the actual value of a monitored parameter representing voltage at the input 290 of the comparator 289 exceeds the upper value of said monitored parameter, the input 291 of the flip-flop 293 receives a one signal produced by the comparator 289. Under the effect of pulses of the generator 298 coming to the input 295 and through the element 299 to the input 301 of the flip-flop 293, said flip-flop develops at its output a stable pulse sequence having a period equal to the repetition period of the pulses of the generator 298 and a duration equal to a time delay introduced by the delay element 299.

As the pulses from the flip-flop 293 are summed up at the input 304 of the counter 303, its contents will be increased. Consequently, the output voltage of the converter 308 will grow until the value of the monitored parameter signal fed to the input 290 of the comparator 289 is between the upper and lower values of the setting signal indicative of the monitored parameter, which is fed to the comparator 289 from the output of the converter 308 through the amplifiers 309 and 310. Next, zero signals appear at the outputs of the comparator 289 and the counter 303 stops after a preset value of the monitored parameter setting signal is recorded at the output of the converter 308 and at the inputs 311 and 312 of the amplifiers 309 and 310.

In further operation, the actual value of the monitored parameter may be below the lower value of the monitored parameter setting signal. A one signal appears at the output of the comparator 289. Said signal, having a duration exceeding the repetition period of the pulses of the generator 298, gives rise to a stable pulse sequence at the output of the flip-flop 294, which is fed to the counter 303. Said counter reduces its contents, which results in a voltage decrease at the output of the converter 308.

This decreases the upper and lower voltage values of the setting signal at the inputs 311 and 312 of the amplifiers 309 and 310 so that the comparator 289 is turned off again.

Thus, after a number of variations relative to the upper and lower values of the monitored parameter setting signal, the contents of the counter 303 will correspond to a statistical mean value of a motored parameter maintained by the welder during the chosen time interval. If the welder decides that welding conditions have been optimal throughout the predetermined period and a steady-state value of the monitored parameter setting signal has to be automatically recorded for subsequent use, he must see to it that a one signal is generated at the input 144 of the unit 114. This is done by breaking the contacts of the element 142 or by inclining the transducer 131 beyond permissible slope limits, that is, by generating at its output a zero signal fed through the inverter 132 to the input 144 of the unit 114. A one signal is applied from the input 144 to the converter 308, thereby disabling it. Indication of the monitored parameter setting signal is provided as said one signal is fed to the setting signal indication circuit 315.

Consider now operation of the counter 303 (FIG. 22) storing information on deviations of a monitored parameter from a preset value. Before the check welding, the counters 452, 453, 458, the shaper 445 and the flip-flop 446 are set to zero. The pulse generator 298 is triggered as the welding process begins. Said generator furnishes the output pulses at the outputs of the flip-flops 293 and 294, which are applied to the inputs 459 and 460 of the counter 458. The pulses derived from said generator 298 are applied through the input 306 of the counter 303 and the operative element 442 to the shaper 445. Upon receipt of the Kth pulse of the generator 298 having a period $t_{298}$, the shaper 445 produces at the first output at the instant K $t_{298}$ a pulse having the period $t_{445-1} = = K_t\, _{298}$ which enters the output code of the reversible counter 458 in the subtracting counter 453 at the control input 455. The pulse from the first output of the shaper 445 transfers the flip-flop 446 to the one state. This enables the element 448 whereby the pulses of the generator 298 will be summed up in the adding counter 452 and the code of the subtracting counter 453 will be decreased by the number of said pulses. When a zero code is set in the subtracting counter 453, its carry output develops a one signal setting the flip-flop 446 to zero and blocking the summation process in the adding counter 452. As subsequent pulses are generated at the first output of the shaper 445, the summation process in the adding counter 452 continues.

After the Nth pulse with a period $t_{445-1}$ is obtained at the first output of the shaper 445, it develops at its second output at the instant N $t_{445-1}$ a pulse with a period $t_{445-2} = N\, t_{445-1}$, which clears the adding counter 452 to zero. After the Zth pulse with a period $t_{445-2}$ is obtained at the second output of the shaper 445, it shapes at its third output at the instant Z $t_{445-2}$ a pulse with a period $t_{445-3} = Z\, t_{445-2}$, which disables the pulse gating element 442 and blocks application of pulses of the generator 298 to the adding counter 452.

Said pulse is also applied to the control input 461 of the counter 458 and writes the averaged (without m lower-order digits where m is determined from the equation $N = 2^m$ for binary counters) output code of the adding counter 452 at the outputs of the reversible counter 458 through its data-inputs 463. The output code of the reversible counter 458 is the code of the monitored parameter setting signal and corresponds to a statistical means value of a monitored parameter maintained by the welding operator during the last time interval $$\Delta t = K \cdot N \cdot t_{298} \qquad (15)$$

where $t_{298}$ is the repetition period of pulses of the generator 298.

Hence, the arc-welding monitor according to the invention is capable of: (1) evaluating occurring metallurgical reactions, more specifically, variable heat input, input of molten filler metal, isolation of metal in gas or arc shielding, primarily by monitoring welding speed; (2) evaluating metal transfers within an arc and melting of base metal by monitoring electrode slope; and (3) evaluating the entire welding process, more specifically, transfer of metal within an arc, melting of base metal, metallurgical reactions by monitoring per-unit length welding energy, welding current, voltage, speed, electrode slope, changes in electrode feed rate and variations of supply-line voltage.

The proposed monitor permits automatic generation of a monitored parameter setting signal characterizing the welding process, resulting in quality welds, and storing its values for a required time period.

The monitor according to the invention prevents generation of excessive sound vibrations in the event of changes in welding current, voltage and speed, which do not interfere with constancy of per-unit length welding energy, and also in the event of changes in electrode feed rate and supply-line voltage, the effect of the latter changes upon the welding process being unrelated to the welder's actions.

In making a quality weld in all welding modes, the monitor generates an audio tone at a frequency dependent on a variation but not on the value of a monitored welding parameter. The proposed monitor provides the welding operator with routine prompting instructions on conducting the welding process at preset values of arc and electrode length, welding speed and electrode slope.

This increases reliability of monitoring the welding process, and, more specifically accuracy of recording variations of welding voltage, current and speed in making a quality weld. This advantage is attributable to checks on constancy of per-unit length welding energy and utilization of setting signal values of welding current, voltage, and per-unit length welding energy corresponding to the values of these parameters in making a quality weld in specific welding conditions. Moreover, the effectiveness of monitoring the welding process is increased, more specifically, due to the fact that the welder's skill is checked in welding at preset values of arc length (electrode length), welding speed, and electrode slope, another check being made on proficiency of welders in general welding techniques. Taken together, the above factors permit a consecutive stage-by-stage welding monitoring process. At the first stage, said process involves monitoring of the welding operations at a preset value of one parameter (arc or electrode length, welding speed, electrode slope) and also welding monitoring at preset values of several parameters (in combination thereof). At the second stage, said process involves monitoring of welding at preset values of one or more parameters provided that per-unit length welding energy is maintained at a constant level.

Furthermore, adaptation takes less time so that the welder may more readily recognize optimal frequency of an audio tone characterizing formation of a quality weld, another advantage being more efficient use of power, materials and welding equipment.

What is claimed is:

1. An arc-welding monitor comprising:
   a weld power supply having an output;
   an audio-signal generator having first, second, third and fourth inputs and an output and generating audio signals dependent on arc-welding parameters;
   a unit for generating a signal proportional to welding current, which has an output and an input connected to said output of said weld power supply;
   a welding current comparator having a first input, a second input and an output; said first input connected to said output of said unit for generating a signal proportional to welding current; said second input receiving welding current setting signals;
   a unit for generating a signal proportional to welding voltage, which has an output and an input connected to said output of said weld power supply;
   a welding voltage comparator having a first input, a second input and an output; said first input connected to said output of said unit for generating a signal proportional to welding voltage; said second input receiving welding voltage setting signals;

a monitoring sequence logic analyzer having a group of inputs, first and second outputs; said group of inputs of said logic analyzer connected to said output of said welding current comparator and to said output of said welding voltage comparator; said logic analyzer comprising:

a first signal switch responsive to variations of monitored parameters, having a group of inputs serving as said inputs of said logic analyzer and an output serving as said first output of said logic analyzer and connected to said first input of said audio-signal generator;

a second signal switch responsive to incremental changes in monitored signals, having a group of inputs and an output serving as said second output of said logic analyzer and connected to said second input of said audio-signal generator;

a welding current adder having a first input connected to said output of said unit for generating a signal proportional to welding current, a second input combined with said second input of said welding current comparator, and an output connected to one of said group of inputs of said second signal switch;

a welding voltage adder having a first input connected to said output of said unit for generating a signal proportional to welding voltage, a second input combined with said second input of said welding voltage comparator, and an output connected to one of said group of inputs of said second signal switch;

a first threshold element having an input connected to said output of said unit for generating a signal proportional to welding current, and an output connected to said third input of said audio-signal generator;

an information recorder having a first input connected to said output of said welding current comparator, a second input connected to said output of said welding voltage comparator, a third input and a fourth input; said recorder receiving signals indicative of variations of monitored parameters and of incremental changes in arc-welding parameters;

a welding operator's helment provided with a playback means connected to said output of said audio-signal generator and receiving, concurrently with said recorder, audio signals to effect audio monitoring of the arc-welding process.

2. A monitor as claimed in claim 1, further comprising a unit for generating a signal proportional to welding speed, having an input and an output connected to said third input of said recorder.

3. A monitor as claimed in claim 1 or 2, effecting monitoring of mechanized consumable-electrode arc welding and further comprising: a consumable-electrode feed rate sensor having an output; a unit for generating signals proportional to a consumable-electrode feed rate, having an input connected to said output of said consumable-electrode feed rate sensor and an output; and a consumable-electrode feed rate comparator having a first input receiving a welding current setting signal, a second input connected to said output of said unit for generating signals proportional to a consumable-electrode feed rate, and an output connected to said fourth input of said information recorder.

4. A monitor as claimed in claim 3, further comprising said logic analyzer provided with a circuit used to determine the effect of a varying consumable-electrode feed rate, having an output and including:

a consumable-electrode feed rate switch having an input connected to said output of said unit for generating a signal proportional to welding current, and an output connected to said first input of said welding current comparator and serving as said output of said circuit used to determine the effect of a varying consumable-electrode feed rate;

a first adder having a first input receiving a welding current setting signal, a second input connected to said output of said unit for generating a signal proportional to a consumable-electrode feed rate, and an output;

a second adder having a first input connected to said output of said first adder, a second input connected to said output of said consumable-electrode feed rate switch, and an output connected to said input of said consumable-electrode feed rate switch.

5. A monitor as claimed in claim 4, wherein said output of said consumable-electrode feed rate switch is connected to said first input of said current adder.

6. A monitor as claimed in claim 4, further comprising: a supply-line voltage transducer connected to said weld power supply and having an output, said second adder of said circuit used to determine the effect of a varying consumable-electrode feed rate, which has a third input connected to said output of said supply-line voltage transducer; a second threshold element having an input connected to said output of said supply-line voltage transducer, and an output; and said information recorder having a fifth input connected to said output of said second threshold element.

7. A monitor as claimed in claim 1 or 2, further comprising a supply-line voltage transducer connected to said weld power supply and having an output; a second threshold element having an input connected to said output of said supply-line voltage transducer, and an output; and said information recorder having a fifth input connected to said output of said second threshold element.

8. A monitor as claimed in claim 7, further comprising said logic analyzer provided with a circuit used to determine the effect of a varying consumable-electrode feed rate, which has an output and includes:

a consumable-electrode feed rate switch having an input connected to said output of said unit for generating a signal proportional to welding current, and an output connected to said first input of said welding current comparator and serving as said output of said circuit used to determine the effect of a varying consumable-electrode feed rate;

a first adder having a first input receiving a welding current setting signal, a second input connected to said output of said unit for generating a signal proportional to a consumable-electrode feed rate, and an output;

a second adder having a first input connected to said output of said first adder, a second input connected to said output of said consumable-electrode feed rate switch, a third input connected to said output of said supply-line voltage transducer, and an output connected to said input of said consumable-electrode feed rate switch.

9. A monitor as claimed in claim 7, wherein said logic analyzer further comprises: a circuit used to determine the effect of a supply-line voltage, which has an output and includes:
- a supply-line voltage adder having a first input connected to said output of said supply-line voltage transducer, a second input, and an output;
- a supply-line voltage switch having a first input connected to said output of said unit for generating a signal proportional to welding voltage, a second input connected to said output of said supply-line voltage adder, and an output connected to said second input of said supply-line voltage adder and to said first input of said welding voltage comparator and serving as said output of said circuit used to determine the effect of a supply-line voltage.

10. A monitor as claimed in claim 1 or 2, furthering: a transducer for measuring slope between electrode axis and normal to surfaces of welded items, having an output connected to an input of said group of inputs of said logic analyzer; a slope switch included in said logic analyzer and having an input connected to said output of said slope transducer, and an output connected to said fourth input of said audio-signal generator; and said information recorder having a sixth input connected to said output of said slope switch.

11. A monitor as claimed in claim 10, wherein said logic analyzer further comprises a write signal setting element having an output and a write signal switch having a first input connected to said output of said slope transducer, a second input connected to said output of said write signal setting element, and an output serving as the output of said logic analyzer.

12. A monitor as claimed in claim 2, further comprising
- said information recorder having a seventh input; said audio-signal generator having a fifth input and a sixth input; a welding speed comparator having a first input connected to said output of said unit for generating a signal proportional to welding speed, a second input and an output connected to said fifth input of said audio-signal generator and to said seventh input of said information recorder; a welding speed setting circuit having a first output connected to said second input of said welding speed comparator and a second output; and
- said logic analyzer comprising a signal subtraction circuit having a first input connected to said output of said unit for generating a signal proportional to welding speed, a second input connected to said second output of said welding speed setting circuit, and an output connected to said sixth input of said audio-signal generator and serving as a third output of said logic analyzer.

13. A monitor as claimed in claim 12, wherein said audio-signal generator using amplitude-frequency modulation further comprises:
- a means for converting voltage corresponding to an increment in a monitored parameter into audio frequency, which has an input and an output;
- a monitored parameter increment signal switch having a first input connected to said output of said second signal switch, a second input connected to said output of said signal subtraction circuit, a control input, and an output connected to said input of said voltage converter;
- a monitored parameter selection circuit having a first input connected to said output of said first signal switch, a second input connected to said output of said welding comparator, and an output connected to said control input of said monitored parameter increment signal switch;
- a multivibrator having an input connected to said output of said monitored parameter selection circuit, and an output; and
- an audio-signal modulation circuit having a first input connected to said output of said multivibrator, a second input connected to said output of said voltage converter, control inputs connected to said output of said monitored parameter selection circuit and to said output of said first threshold element, and an output acting as the output of said audio-signal generator and connected to said playback means.

14. A monitor as claimed in claim 13, wherein said logic analyzer further comprises: a modulation mode switch having a first input connected to said output of said welding current adder, a second input connected to said output of said welding voltage adder, a third input connected to said output of said per-unit length welding energy adder, and an output connected to said input of said converter used to convert voltage corresponding to an increment in a monitored parameter.

15. A monitor as claimed in claim 14, wherein said audio-signal generator further comprises: a first additional frequency modulation OR gate having a first input connected to said output of said audio-frequency modulation circuit, a second input, and an output; a second additional frequency modulation OR gate having a first input connected to said output of said audio-signal modulation circuit, a second input, and an output; and an electrode slope multivibrator having an input connected to said output of said slope switch, and an output connected to said second input of said first additional frequency modulation OR gate and to said second input of said second additional frequency modulation OR gate.

16. A monitor as claimed in claim 13, wherein said monitored parameter selection circuit further comprises:
- a power line passing a logic zero;
- a power line passing a logic one;
- a first AND gate having a first input serving as a first input of said audio-signal generator, a second input, and an output;
- a second AND gate having a first input serving as a fifth input of said audio-signal generator, a second input, and an output;
- a chosen parameter transmission switch having a first input connected to said output of said first AND gate and to said power lines passing logic zero and logic one signals, a second input connected to said output of said second AND gate, and outputs;
- a first flip-flop having inputs connected to said outputs of said chosen parameter transmission switch, a first output, and a second output;
- a first output AND gate having a first input connected to said first output of said first flip-flop, a second input connected to said output of said signal switch responsive to variations of monitored parameters and combined with said first input of said first AND gate and with said second input of said second AND gate, and an output;
- a second output AND gate having a first input connected to said second output of said first flip-flop, a second input connected to said output of said welding speed comparator and combined with said second input of said first AND gate and with said second input of said second AND gate, and an output; and an OR gate having a first input connected to said output of said first output AND gate, a second input connected to said output of said second output AND gate, and an output serving as an output of said monitored parameter selection circuit.

17. A monitor as claimed in claim 13, wherein said audio-signal modulation circuit comprises further third and fourth AND gates.

18. A monitor as claimed in claim 12, further comprising:
said information recorder having an eighth input;
a unit for generating a signal proportional to per-unit length welding energy, having a first input connected to said output of said unit for generating a signal proportional to welding current, a second input connected to said output of said unit for generating a signal proportional to welding voltage, a third input connected to said output of said unit for generating a signal proportional to welding speed, and an output connected to said input of said logic analyzer;
said audio-frequency generator having a seventh input;
a per-unit length welding comparator having a first input connected to said output of said unit for generating a signal proportional to per-unit length welding energy, a second input receiving a per-unit length welding energy setting signal, and an output connected to said eighth input of said information recorder;
said logic analyzer further comprising: a per-unit length welding energy switch having an input connected to said output of said per-unit length welding energy switch and an output serving as the fourth output of said logic analyzer and connected to said seventh input of said audio-signal generator, and a per-unit length welding energy adder having a first input connected to said output of said unit for generating a signal proportional to per-unit length welding energy, a second input receiving a per-unit length welding energy setting signal and an output serving as said fifth output of said logic analyzer and connected to said input of said audio-frequency generator.

19. A monitor as claimed in claim 2, further comprising:
said information recorder having an eighth input;
a unit for generating a signal proportional to welding energy per unit length along a monitored weld seam, having a first input connected to said output of said unit for generating a signal proportional to welding current, a second input connected to said output of said unit for generating a signal proportional to welding voltage, a third input connected to said output of said unit for generating a signal proportional to welding speed, and an output connected to said input of said logic analyzer;
a per-unit length welding energy comparator having a first input connected to said output of said unit for generating a signal proportional to per-unit length welding energy, a second input receiving a per-unit length welding energy setting signal, and an output connected to said eighth input of said information recorder;
said audio-signal generator having a seventh input;

said logic analyzer further comprising a per-unit length welding energy switch having an input connected to said output of said per-unit length welding energy comparator, and an output serving as a fourth output of said logic analyzer and connected to said seventh input of said audio-signal generator; and a per-unit length welding energy adder having a first input connected to said output of said unit for generating a signal proportional to per-unit length welding energy, a second input receiving a per-unit length welding energy setting signal, and an output serving as said fifth output of said logic analyzer and connected to said seventh input of said audio-signal generator.

20. A monitor as claimed in claim 19, further comprising:
a unit for generating a setting signal indicative of a monitored welding parameter chosen from such quantities as welding current, voltage and per-unit length welding energy, having an input and an output; and
said logic analyzer including:
a first welding current setting signal switch having an input and an output connected to said second input of said welding current comparator;
a second welding voltage setting signal switch having an input and an output connected to said second input of said welding voltage comparator;
a third per-unit length welding energy setting signal switch having an input and an output connected to said second input of said per-unit length welding energy comparator;
a setting signal switching unit having an input connected to said output of said unit for generating a monitored parameter setting signal, a first output connected to said input of said first setting signal switch, a second output connected to said input of said second setting signal switch, a third output connected to said input of said third setting signal switch; and
a present signal switching unit having a first input connected to said output of said unit for generating a signal proportional to welding current, a second input connected to said output of said unit for generating a signal proportional to welding voltage, a third input connected to said output of said unit for generating a signal proportional to per-unit welding energy, and an output connected to said input of said unit length for generating a monitored parameter setting signal.

21. A monitor as claimed in claim 20, wherein said unit for generating a monitored parameter setting signal includes:
a clock-pulse generator;
a monitored parameter comparator having a first input connected to said output of said logic analyzer, a second input, and outputs;
a first flip-flop for recording deviations of a monitored parameter from a preset value, which has a data input connected to said output of said monitored parameter comparator, clock inputs connected to said clock-pulse generator, and an output;
a second flip-flop for recording deviations of a monitored parameter from a preset value, which has a data input connected to said output of said monitored parameter comparator, clock inputs connected to said clock-pulse generator, and an output;

a counter storing deviations of a monitored parameter from a preset value, which has a first input connected to said output of said first write flip-flop, a second input connected to said output of second write flip-flop, a clock input connected to said clock-pulse generator, and outputs;

a second converter used to convert code into voltage corresponding to a monitored parameter, which has inputs connected to said outputs of said deviation counter, and an output serving as an output of said unit for generating a monitored parameter setting signal;

a first amplifier having an input connected to said output of said second code-to-voltage converter, and an output connected to said second input of said monitored parameter comparator;

a second amplifier having an input connected to said output of said second code-to-voltage converter, and an output connected to said second input of said monitored parameter comparator; and a setting signal indication circuit having data inputs connected to said outputs of said deviation counter, and a control input combined with said control input of said second code-to-voltage converter and connected to said output of said logic analyzer.

22. A monitor as claimed in claim 20, wherein said logic analyzer comprises a signal switch responsive to a change in the sign of monitored parameters, having a first input connected to said output of said welding current comparator, a second input connected to said output of said welding voltage comparator, and an output; while said audio-signal generator includes:

a switch for selecting a monitored parameter from such quantities as welding current, voltage, speed and per-unit length welding energy, which has a first input connected to said output of said first signal switch, a second input connected to said output of said welding speed comparator, and an output;

a monitored parameter address switch having a first input connected to said output of said monitored parameter selection switch, a second input connected to said output of said per-unit length welding energy switch, a third input connected to said output of said welding speed comparator, a fourth input connected to said output of said logic analyzer, a fifth input connected to said output of said signal comparator responsive to a change in the sign of monitored parameters, a control input, a control output, and a group of outputs;

a monitored parameter address counter having a complementing input connected to a control output of said monitored parameter address switch, a first output connected to said control input of said monitored parameter address switch, and a group of outputs;

a storage having a group of inputs connected to said group of outputs of said monitored parameter address switch and to said group of outputs of said monitored parameter address counter, and outputs; said storage wherein codes of monitored parameters are stored;

a first code-to-voltage converter used to convert code into voltage corresponding to a monitored parameter, which has inputs connected to said outputs of said storage, and an output; and an output signal gating element having a first input connected to said output of said first code-to-voltage converter, a second input connected to said output of said first threshold element, and an output serving as an output of said audio-signal generator.

23. A monitor as claimed in claim 20, length comprising a transducer for measuring slope between electrode axis and normal to surfaces of welded items, which has an output; and said logic analyzer including a write signal setting element having an output and a write signal switch having a first input connected to said output of said slope transducer, a second input connected to said output of said write signal setting element, and an output connected to said input of said unit for generating a monitored parameter setting signal.

24. A monitor as claimed in claim 19, in which said logic analyzer further comprises: a signal switch responsive to a change in the sign of monitored parameters, having a first input connected to said output of said welding current comparator, a second input connected to said output of said welding voltage comparator, and an output; while said audio-signal generator includes:

a switch for selecting a monitored parameter from such quantities as welding current, voltage, speed and per-unit length welding energy, having a first input connected to said output of said first signal switch, a second input connected to said output of said welding speed comparator, and an output;

a monitored parameter address switch having a first input connected to said output of said monitored parameter selection switch, a second input connected to said output of said per-unit length welding energy switch, a third input connected to said output of said welding speed comparator, a fourth input connected to said output of said logic analyzer, a fifth input connected to said output of said signal comparator responsive to a change in the sign of monitored parameters, a control input, a control output and a group of outputs;

a monitored parameter address counter having a complementing input connected to the control output of said monitored parameter address switch, a first output connected to said control input of said monitored parameter address switch, and a group of outputs;

a storage having a group of inputs connected to said group of outputs of said monitored parameter address switch and to said group of outputs of said monitored parameter address counter, and outputs; said storage wherein codes of monitored parameters are stored;

a first converter used to convert code into voltage corresponding to a monitored parameter, which has inputs connected to said outputs of said storage, an and output; and an output signal gating element having a first input connected to said output of said first code-to-voltage converter, a second input connected to said output of said first threshold element, and an output serving as the output of said audio-signal generator.

25. A monitor as claimed in claim 24, further comprising a transducer for measuring slope between electrode axis and normal to surfaces of welded items, which has an output connected to an input of said group of inputs of said logic analyzer; said logic analyzer including a slope switch having an input connected to said output of said slope transducer, and an output connected to said input of said audio-signal generator; said fourth input of said monitored parameter address switch connected to said output of said slope switch; and information recorder having a sixth input connected to said output of said slope switch.

26. A monitor as claimed in claim 19, wherein said welding voltage adder has a third input connected to said output of said supply-line voltage switch.

27. A monitor as claimed in claim 26, wherein said logic analyzer further comprises: a monitoring mode switch having a first input connected to said output of said unit for generating a signal proportional to welding current, a second input connected to said output of said unit for generating a signal proportional to welding voltage, a third input connected to said output of said circuit used to determine the effect of a varying consumable-electrode feed rate, a fourth input connected to said output of said circuit used to determine the effect of a supply-line voltage, first and second outputs connected, respectively, to said first input and to said second input of said unit for generating a signal proportional to per-unit length welding energy.

28. A monitor as claimed in claim 26, further comprising:
said information recorder having an eighth input;
a unit for generating a signal proportional to per-unit length welding energy, having a first input connected to said output of said unit for generating a signal proportional to welding current, a second input connected to said output of said unit for generating a signal proportional to welding voltage, a third input connected to said output of said unit for generating a signal proportional to welding speed, and an output connected to said input of said logic analyzer;
a per-unit length welding energy comparator having a first input connected to said output of said unit length for generating a signal proportional to per-unit length welding energy, a second input receiving a per-unit length welding energy setting signal, and an output connected to said eighth input of said information recorder;
said audio-signal generator having a seventh input;
said logic analyzer including a per-unit length welding energy switch having an input connected to said output of said per-unit welding energy comparator and an output serving as a fourth output of said logic analyser and connected to said seventh input of said audio-signal generator; and a per-unit length welding energy adder having a first input connected to said output of said unit for generating a signal proportional to per-unit length welding energy, a second input receiving a per-unit length welding energy setting signal, and an output serving as said output of said logic analyzer and connected to said input of said audio-signal generator; and
said monitored parameter selection circuit including a first OR gate for selecting a signal indicative of per-unit length welding energy, which has a first input connected to said first output of said first flip-flop, a second input connected to said output of said per-unit length welding energy switch, and an output; a second OR gate for selecting a signal indicative of per-unit length welding energy, which has a first input connected to said second output of said first flip-flop, a second input connected to said output of said per-unit length welding energy switch, and an output; said first output AND gate having a third input connected to said output of said per-unit length welding energy switch; said second output AND gate having a third input connected to said output of said per-unit length welding energy switch; said output of the first signal selection OR gate and said output of the second signal selection OR gate, which serve as outputs of said monitored parameter selection circuit; and said monitored parameter increment switch having a third input connected to said output of said per-unit length energy adder.

29. A monitor as claimed in claim 2, further comprising:
said information recorder having ninth, tenth and eleventh inputs;
a welding timer having a control input connected to said output of said unit for generating a signal proportional to welding speed, and an output connected to said ninth input of said information recorder;
a gating element having a first input connected to said output of said welding timer, a second input connected to said output of said first threshold element, and an output connected to said tenth input of said information recorder;
said logic analyzer further comprising AND gates whose number corresponds to the number of monitored parameters, each AND gate having a first input connected to said output of the respective comparator, a second input connected to said output of said gating element, and an output connected to said eleventh input of said information recorder.

30. A monitor as claimed in claim 2, wherein said unit for generating a signal proportional to welding speed includes:
a plurality of radiation sensors disposed along a monitored weld formed during the arc-welding process, each radiation sensor of said plurality of sensors having an output;
a radiation signal switch having control inputs, data inputs connected to said output of each radiation sensor, and an output;
a pulse generator having an output;
a radiation signal gating element having a first input connected to said output of said radiation signal switch, a second input connected to said output of said pulse generator, a third input, and an output;
a means for shaping a signal responsive to radiation, having an input connected to said output of said radiation signal gating element, and an output serving as the output of said unit for generating a signal proportional to welding speed; and
a radiation sensor address shaper having an input connected to said output of said means for shaping a signal responsive to radiation, outputs connected bit-by-bit to the respective control inputs of said radiation signal switch, and a control output connected to said third input of said radiation signal gating element.

31. An arc-welding monitor, comprising:
a weld power supply having an output;
an audio-signal generator having first, second, third and fourth inputs and an output and generating audio signals depending on arc-welding parameters;

a unit for generating a signal proportional to welding current, which has an output and an input connected to said output of said weld power supply;

a welding current comparator having a first input, a second input and an output; said first input connected to said output of said unit for generating a signal proportional to welding current; said second input receiving welding current setting signals;

a unit for generating a signal proportional to welding voltage, which has an output and an input connected to said output of said weld power supply;

a welding voltage comparator having a first input, a second input and an output; said first input connected to said output of said unit for generating a signal proportional to welding voltage; said second input receiving welding voltage setting signals;

a unit for generating a signal proportional to welding speed, which has an input and an output;

a first threshold element having an input connected to said output of said unit for generating a signal proportional to welding current, and an output connected to said first input of said audio-signal generator;

a supply-line voltage transducer connected to said weld power supply and having an output;

a second threshold element having an input connected to said output of said supply-line voltage transducer, and an output;

a transducer for measuring slope between electrode axis and normal to surfaces of welded items, which has an output;

a welding speed comparator having a first input connected to said output of said unit for generating a signal proportional to welding speed, a second input and an output connected to said second input of said audio-signal generator;

a unit for generating a signal proportional to per-unit length welding energy, which has a first input connected to said output of said unit for generating a signal proportional to welding current, a second input connected to said output of said unit for generating a signal proportional to welding voltage, a third input connected to said output of said unit for generating a signal proportional to welding speed, and an output;

a per-unit length welding energy comparator having a first input connected to said output of said unit for generating a signal proportional to per-unit length welding energy, a second input receiving a per-unit length welding energy setting signal, and an output;

a welding speed setting circuit having an output connected to said second input of said welding speed comparator;

a welding timer having a control input connected to said output of said unit for generating a signal proportional to welding speed, and an output;

a gating element having a first input connected to said output of said welding timer, a second input connected to said output of said first threshold element, and an output;

a monitoring sequence logic analyzer having a group of inputs, first, second and third outputs; said group of inputs of said logic analyzer connected to said output of said welding current comparator, to said output of said welding voltage comparator, to an output of said slope transducer, to said output of the unit for generating a signal proportional to per-unit length welding energy and to said output of said welding timer; said logic analyzer including:

a first signal switch indicative of variations of monitored parameters, which has a group of inputs acting as said inputs of said logic analyzer, and an output serving as said first output of said logic analyzer and connected to said first input of said audio-signal generator;

a second signal switch indicative of incremental changes in monitored parameters, which has inputs combined in a group and an output serving as said second output of said logic analyzer and connected to said output of said audio-signal generator;

a welding current adder having a first input connected to said output of said unit for generating a signal proportional to welding current, a second input connected to said second input of said welding current comparator, and an output connected to said input of said group of inputs of said second signal switch;

a welding voltage adder having a first input connected to said output of said unit for generating a signal proportional to welding voltage, a second input combined with said second input of the welding voltage comparator, and an output connected to said input of said group of inputs of said second signal switch;

a slope switch having an input connected to said output of said slope transducer, and an output connected to said third input of said audio-signal generator;

a signal subtraction circuit having a first input connected to said output of said input for generating a signal proportional to welding speed, a second input connected to said output of said welding speed setting circuit, and an output connected to said fourth input of said audio-signal generator;

a per-unit length welding energy switch having an input connected to said output of said per-unit length welding comparator, and an output serving as said third output of said logic analyzer;

a per-unit length welding energy adder having a first input connected to said output of said unit for generating a signal proportional to per-unit length welding energy, a second input receiving a per-unit length welding energy setting signal, and an output serving as said output of said logic analyzer and connected to said input of said audio-signal generator;

AND gates forming a group of AND gates whose number corresponds to the number of monitored parameters; each AND gate having a first input connected to an output of one of said comparators chosen from a group of welding current, voltage, speed and per-unit length energy comparators, a second input connected to said output of said gating element, and an output;

an information recorder having a first input connected to said output of said welding current comparator, a second input connected to said output of said welding voltage comparator, a third input connected to said output of said welding speed comparator, a fourth input connected to said output of said first threshold element and to said output of said second threshold element, a fifth input connected to said output of said slope comparator, a sixth input connected to said output of said output of said per-unit welding energy comparator, a seventh input connected to said output of said welding timer, to said output of said gating element and to said output of each named AND gate of said group of AND gates; said information recorder receiving signals indicative of variations of monitored parameters taken separately or in combinations from a group of such quantities as welding current, voltage, speed, electrode slope, per-unit length energy, supply-line voltage, and signals indicative of incremental changes in said arc-welding parameters;

a welding operator's helmet provided with a playback means connected to said output of said audio-signal generator and receiving, concurrently with said recorder, signals conveying audible information required to effect audio monitoring of the arc-welding process.

32. A monitor as claimed in claim 31, wherein said logic analyzer further comprises:

a circuit used to determine the effect of supply-line voltage, which has an output and includes:

a supply-line voltage adder having a first input connected to said output of said supply-line voltage transducer, a second input and an output;

a supply-line voltage switch having a first input connected to said output of said unit for generating a signal proportional to welding voltage, a second input connected to said output of said supply-line voltage adder, and an output connected to said second input of said supply-line voltage adder and to said first input of said supply-line voltage comparator;

a write signal setting element having an output; and a write signal switch having a first input connected to said output of said slope transducer, a second input connected to said output of said write signal setting element, and an output serving as an output of said logic analyzer.

33. A monitor as claimed in claim 31 or 32, wherein said unit for generating a signal proportional to welding speed comprises:

a multitude of radiation sensors disposed along a monitored weld formed by arc welding; each radiation sensor of said multitude of sensors having an output;

a radiation signal switch having control inputs, data inputs connected to said output of each radiation sensor, and an output;

a pulse generator having an output;

a radiation signal gating element having a first input connected to said output of said radiation signal switch, a second input connected to said output of said pulse generator, a third input, and an output;

a means for shaping a signal indicative of radiation, which has an input connected to said output of said radiation signal gating element, and an output serving as an output of said unit for generating a signal proportional to welding speed; and a radiation sensor address shaper having an input connected to said output of said means for shaping a signal indicative of radiation, outputs connected bit-by-bit to the respective control inputs of said radiation signal switch, and a control output connected to said third input of said radiation signal gating element.

34. A monitor as claimed in claim 31, effecting monitoring of mechanized consumable-electrode arc-welding operations and comprising: a consumable-electrode feed rate sensor having an output; a unit for generating signals proportional to a consumable-electrode feed rate, which has an input connected to said output of said consumable-electrode feed rate sensor, and an output; and a consumable-electrode feed rate comparator having a first input receiving a welding current setting signal, a second input and an output connected to said eighth input of said information recorder; said logic analyzer having a circuit used to determine the effect of a varying consumable-electrode feed rate, which has an output and includes:

a consumable-electrode feed rate switch having an input connected to said output of said unit for generating a signal proportional to welding current, and an output connected to said first input of said welding current comparator and to said first input of said welding current adder;

a first adder having a first input receiving a welding current setting signal, a second input connected to said output of said unit for generating a signal proportional to a consumable-electrode feed rate, and an output;

a second adder having a first input connected to said output of said first adder, a second input connected to said output of said consumable-electrode feed rate switch, and an output connected to said input of said consumable-electrode feed rate switch.

35. A monitor as claimed in claim 31 or 32 or 34, wherein said audio-signal generator using amplitude-frequency modulation comprises:

a converter used to convert voltage corresponding to an increment in a monitored parameter into audio frequency, which has an input and an output;

a monitored parameter increment signal switch having a first input connected to said output of said second signal switch, a second input connected to said output of said signal subtraction circuit, a control input and an output connected to said input of said voltage converter;

a monitored parameter selection circuit having a first input connected to said output of said first signal switch, a second input connected to said output of said welding speed comparator, and an output connected to said control input of said monitored parameter increment signal switch;

a multivibrator having an input connected to said output of said monitored parameter selection circuit, and an output;

an audio-signal modulation circuit having a first input connected to said output of said multivibrator, a second input connected to said output of said voltage converter, control inputs connected to said output of said monitored parameter selection circuit and to said output of said first threshold element, and an output service as an output of the audio-signal generator and connected to said playback means;

a first additional frequency modulation OR gate having a first input connected to said output of said audio-signal modulation circuit, a second input, and an output;

a second additional frequency modulation OR gate having a first input connected to said output of said audio-signal modulation circuit, a second input, and an output;

an electrode slope multivibrator having an input connected to said output of said slope switch and an output connected to said second input of said first additional frequency modulation OR gate and to said second input of said second additional frequency modulation OR gate;
while said logic analyzer comprises a modulation mode switch having a first input connected to said output of said welding current adder, a second input connected to said output of said welding voltage adder, a third input connected to said output of said per-unit welding energy adder, and an output connected to said input of said converter used to convert voltage corresponding to an increment in a monitored parameter;
said monitored parameter selection circuit comprising:
  a power line passing a logic zero;
  a power line passing a logic one;
  a first AND gate having a first input serving as a first input of said audio-signal generator, a second input, and an output;
  a second AND gate having a first input serving as a fifth input of said audio-signal generator, a second input, and an output;
  a chosen parameter transmission switch having a first input connected to said output of said first AND gate and to said power lines passing logic zero and logic one signals, a second input connected to said second AND gate, and outputs;
  a first flip-flop having inputs connected to said outputs of said chosen parameter transmission switch, a first output and a second output;
  a first output AND gate having a first input connected to said first output of said flip-flop, a second input connected to said output of said signal switch responsive to variations of monitored parameters and combined with said first input of said first AND gate with said second input of said second AND gate, a third input connected to said second output of said per-unit welding energy comparator, and an output;
  a second output AND gate having a first input connected to said second output of said first flip-flop, a second input connected to said output of said welding speed comparator and combined with said second input of said first AND gate and with said second input of said second AND gate, a third input connected to said third output of said per-unit welding energy comparator, and an output;
  an OR gate having a first input connected to said output of said first output AND gate, a second input connected to said output of said second output AND gate, and an output serving as an output of said monitored parameter selection circuit;
  a first OR gate for selecting a signal corresponding to per-unit welding energy, which has a first input connected to said first output of said first flip-flop, a second input connected to said output of said per-unit welding energy switch, and an output;
  a second OR gate for selecting a signal corresponding to per-unit welding energy, which has a first input connected to said second output of said first flip-flop, a second input connected to said output of said per-unit welding energy switch, and an output.

36. A monitor as claimed in claim 31 or 32 comprising:
  a unit for generating a setting signal indicative of a monitored welding parameter chosen from a group of such quantities as welding current, voltage and per-unit length energy, said unit, having an input and an output;
  said logic analyzer including:
    a first welding current setting signal switch having an input and an output connected to said second input of said welding current comparator;
    a second welding voltage setting signal switch having an input and an output connected to said second input of said welding current comparator;
    a third per-unit length welding energy setting signal switch having an input and an output connected to said second input of said per-unit length welding energy comparator;
    a setting signal switching unit having an input connected to said output of said unit for generating a monitored parameter setting signal, a first output connected to said input of said first setting signal switch, a second output connected to said input of said second setting signal switch, and a third output connected to said input of said third setting signal switch;
    a present signal switching unit having a first input connected to said output of said unit for generating a signal proportional to welding current, a second input connected to said input of said unit for generating a signal proportional to welding voltage, a third input connected to said output of said unit for generating a signal proportional to per-unit length welding energy, and an output connected to said input of said unit for generating a monitored parameter setting signal;
  said unit for generating a monitored parameter setting signal including:
    a clock-pulse generator;
    a monitored parameter comparator having a first input connected to said output of the logic analyzer, a second input, and an output;
    a first flip-flop recording deviations of a monitored parameter from a preset value, which has a data input connected to said output of said monitored parameter comparator, clock inputs connected to said clock-pulse generator, and an output;
    a second flip-flop recording deviations of a monitored parameter from a preset value, which has a data input connected to said output of said monitored parameter comparator, clock inputs connected to said clock-pulse generator, and an output;
    a counter storing deviations of a monitored parameter from a preset value, which has a first input connected to said output of said first write flip-flop, a second input connected to said output of said second write flip-flop, a clock input connected to said clock-pulse generator, and outputs;
    a second converter used to convert code into voltage corresponding to a monitored parameter, which has inputs connected to said outputs of said deviation counter, and an output serving as an output of said unit for generating a monitored parameter setting signal;
    a first amplifier having an input connected to said output of said second code-to-voltage converter, and an output connected to said second input of said monitored parameter comparator;

a second amplifier having an input connected to said output of said second code-to-voltage converter, and an output connected to said second input of said monitored parameter comparator; and a setting signal indication circuit having data inputs connected to said outputs of said deviation counter, and a control input combined with said control input of said second code-to-voltage converter and connected to said output of said logic analyzer.

37. A monitor as claimed in claim 31 or 32, wherein said logic analyzer comprises a signal switch responsive to a change in the sign of monitored parameters, which has a first input connected to said output of said welding current comparator, a second input connected to said output of said welding voltage comparator, and an output; while said audio-signal generator includes:

a switch for selecting a monitored parameter from a group of such quantities as welding current, voltage, speed and per-unit length energy, which has a first input connected to said output of said first signal switch, a second input connected to said output of said welding speed comparator, and an output;

a monitored parameter address switch having a first input connected to said output of said monitored parameter selection switch, a second input connected to said output of said per-unit length welding energy switch, a third input connected to said output of said welding speed comparator, a fourth input connected to said output of said logic analyzer, a fifth input connected to said output of said slope switch, a sixth input connected to said output of said signal comparator responsive to a change in the sign of monitored parameters, a control input, a control output, and a group of outputs;

a monitored parameter address counter having a complementing input connected to a control output of said monitored parameter address switch, a first output connected to said control input of said monitored parameter address switch, and a group of outputs;

a storage having a group of inputs connected to said group of outputs of said monitored parameter address switch and to said group of inputs of said monitored parameter address counter, and outputs; said storage wherein codes of monitored parameters are stored;

a first converter used to convert code into voltage corresponding to a monitored parameter, which has inputs connected to said outputs of said storage, and an output;

an output signal gating element having a first input connected to said output of said first code-to-voltage converter, a second input connected to said output of said first threshol element, and an output serving as an output of said audio-signal generator.

* * * * *